US008617480B2

(12) United States Patent
Funaoka et al.

(10) Patent No.: US 8,617,480 B2
(45) Date of Patent: Dec. 31, 2013

(54) CONCENTRATED ACID TREATMENT UNIT, CONCENTRATED ACID TREATMENT METHOD, PHASE-SEPARATION SYSTEM PLANT FOR BOTANICAL RESOURCE, AND CONVERSION METHOD

(75) Inventors: Masamitsu Funaoka, Mie (JP); Keigo Mikame, Mie (JP); Hideo Noda, Hyogo (JP)

(73) Assignees: Japan Science and Technology Agency, Saitama (JP); Kansai Chemical Engineering Co., Ltd., Hyogo (JP)

( * ) Notice: Subject to any disclaimer, the term of this patent is extended or adjusted under 35 U.S.C. 154(b) by 242 days.

(21) Appl. No.: 13/125,040

(22) PCT Filed: Oct. 21, 2009

(86) PCT No.: PCT/JP2009/068149
§ 371 (c)(1),
(2), (4) Date: Apr. 19, 2011

(87) PCT Pub. No.: WO2010/047358
PCT Pub. Date: Apr. 29, 2010

(65) Prior Publication Data
US 2011/0196136 A1 Aug. 11, 2011

(30) Foreign Application Priority Data
Oct. 23, 2008 (JP) ................. 2008-273633

(51) Int. Cl.
*B01J 19/00* (2006.01)
*C07G 1/00* (2011.01)
*C08H 7/00* (2011.01)
*C08L 97/00* (2006.01)

(52) U.S. Cl.
USPC .......... 422/225; 422/129; 422/224; 422/226; 530/500; 530/502; 366/241

(58) Field of Classification Search
USPC ................. 422/129, 224–226; 530/500, 502; 366/241
See application file for complete search history.

(56) References Cited

U.S. PATENT DOCUMENTS

2007/0003654 A1* 1/2007 Morimoto ................. 425/208
2007/0135622 A1* 6/2007 Hayashi et al. ............ 530/502

FOREIGN PATENT DOCUMENTS

| JP | H2-233701 A | 9/1990 |
| JP | H9-278904 A | 10/1997 |

(Continued)

OTHER PUBLICATIONS

Machine translation of JP 2008-266266 A, which was published on Nov. 6, 2008.*

(Continued)

*Primary Examiner* — Walter D Griffin
*Assistant Examiner* — Natasha Young
(74) *Attorney, Agent, or Firm* — Chen Yoshimura LLP

(57) ABSTRACT

A concentrated acid treatment unit is composed of a reaction section and an agitation extraction section. A phenol sorped raw material obtained by defatting botanical resource-derived raw material by solvent to subject sorption phenols to sorption is introduced, thus obtaining mixed solution of phenol solution including a lignophenol derivative and concentrated acid solution including a cellulose hydrolysate. The reaction section agitates and mixes the phenol sorped raw material and concentrated acid to cause cellulose to be swollen to thereby convert lignin to lignophenol. A part of the cellulose is subjected to hydrolysis. The agitation extraction section receives the treated liquid sent from the reaction section and adds phenols for extraction thereto to cause lignophenol dispersed in the concentrated acid solution to be dissolved and extracted in phenols for extraction.

8 Claims, 17 Drawing Sheets

(56) References Cited

FOREIGN PATENT DOCUMENTS

| | | | |
|---|---|---|---|
| JP | 2001-131201 A | | 5/2001 |
| JP | 2006-248955 A | | 9/2006 |
| JP | 2008-231213 A | | 10/2008 |
| JP | 2008266266 A | * | 11/2008 |
| SU | 886929 A | * | 12/1981 |
| WO | WO 83/02125 A1 | * | 12/1982 |
| WO | WO 8302125 A1 | * | 6/1983 |

OTHER PUBLICATIONS

Mikame et al., "Shokubutsu Shigen Renzokushiki Henkan System no Sekkei", Dai 58 Kai Proceedings of the thermosetting plastics symposium Japan, Oct. 9, 2008, pp. 37 to 40, Gousei Jushi Kougyo Kyokai, Tokyo, Japan.

Mikame et al., "Renzokushiki Shokubutsu Shigen Henkan System Plant no Sekkei", Hatten Kenkyu (SORST) Funaoka Mitsumasa Kenkyu Project, 'Shokubutsukei Bunshi Sozai no Chikuji Seimitsu Kino Seigyo System', Sokatsu Symposium Koen Yoshihu, Jan. 14-15, 2009, pp. 5 to 8, Japan.

International Search Report (ISR) issued in PCT/JP2009/068149 (International application) mailed in Jan. 2010 for Examiner consideration.

Written Opinion (PCT/ISA/237) issued in PCT/JP2009/068149 (International application) mailed in Jan. 2010.

International Preliminary Report on Patentability Chapter II (PCT/IPEA/409) issued in PCT/JP2009/068149 (International application) completed in Dec. 2010 for Examiner consideration.

\* cited by examiner

CONCENTRATED ACID TREATMENT UNIT, CONCENTRATED ACID TREATMENT METHOD, PHASE-SEPARATION SYSTEM PLANT FOR BOTANICAL RESOURCE, AND CONVERSION METHOD

TECHNICAL FIELD

The present invention relates to a Phase-Separation system plant for botanical resource and a conversion method by which carbohydrate and a lignophenol derivative can be separated and recovered from a botanical resource as a lignocellulosic composite material, as well as a concentrated acid treatment unit and a concentrated acid treatment method used for the conversion apparatus and the conversion method.

BACKGROUND ART

In order to use a botanical resource as an alternative industrial raw material of petroleum oil effectively, the botanical resource must be used as a molecule material. Thus, it is important to efficiently separate the respective constituents of a plant that are highly combined at the molecular level while maintaining the molecular functions.

For example, wood is a composite of carbohydrates and lignin whose structure and property are completely different. As a method for separating wood into two components of carbohydrates and lignin, an organosolv method and a solvolysis method for example have been suggested. As a pretreatment method, an explosion method and an autohydrolysis method for example have been suggested. However, in the case of the component separation by these methods, high energy is required and the separation is promoted incompletely. The reason is that cell walls include therein carbohydrates and lignin mixed in a complicated manner. Furthermore, the above separation methods cause a significant modification of lignin during an addition of high energy, thus causing a difficulty of the subsequent use.

Thus, in order to achieve a complete component separation without damaging the original characteristics of lignin, it is required to set an optimal condition for the individual constituting materials to decompose the mixed carbohydrates and lignin under a low-energy condition.

One method for breaking the wood tissue structure on the basis of the molecular level is a treatment by sulfate. For example, a concentrated sulfate treatment causes cellulose to be swollen and the cellulose is further caused to have a partial hydrolysis and dissolution, resulting in a broken cell wall structure. The wood hydrolysis method using concentrated sulfate is already substantially technically established and is a complete and low-cost method from the viewpoint of the component separation.

However, the wood hydrolysis method using concentrated acid is disadvantageous, in order to realize a component separation method for the full use of wood, in that condensed lignin is inactivated. Such highly-condensed lignin includes rigid molecules. Thus, activation by structure modification or the depolymerization thereof is difficult. This is one of the reasons that have prevented a wood processing industry using acid hydrolysis as a core. The inactivated lignin in the concentrated acid treatment process is caused by the non-existence of medium to lignin in the reaction system.

There is a technique to separate cell wall constituent that is a main constituent of a plant (i.e., a lignocellulosic composite of lignin and material such as cellulose or hemicelluloses) using phenol and concentrated acid to thereby obtain the derivative thereof (e.g., see Patent documents 1 and 2).

A phenol derivative such as cresol is a good solvent to lignin and has reactivity similar to that of a lignin aromatic nucleus. Cresol has a high affinity to lignin and always exists together with lignin in the reaction system. However, cresol cannot be substantially mixed with concentrated acid. To solve this, wood meals are firstly treated by cresol so that the interior of the wood meals is sufficiently permeated with cresol. Thereafter, concentrated acid having a high affinity to carbohydrates is added to the mixture while intensely agitating the mixture at room temperature. Then, cellulose is immediately swollen and the wood meals have a broken tissue structure, thus cellulose is hydrolyzed. Since lignin is surrounded by cresol that is not mixed with concentrated acid, at the timing of the addition of concentrated acid, the contact of lignin with acid is suppressed as much as possible. The agitation causes acid to be mixed in cresol and phenol is bound to the benzyl position of lignin, thereby generating a lignophenol derivative.

A lignophenol derivative is included in cresol solution. A cellulose hydrolysate is included in concentrated acid solution. By distilling cresol away, such a lignophenol derivative is obtained that has a lighter color and is more active than in the case of Milled Wood Lignin (MWL). On the other hand, acid solution includes therein carbohydrate as a monosaccharide such as glucose, oligosaccharide, or polymer.

During a treatment process, lignin is partially depolymerized but carbonium ion generated during the process is immediately stabilized by cresol, thus suppressing the self-condensation of lignin. After the treatment, the agitation is stopped to thereby cause a reaction mixture to be immediately separated to cresol solution and concentrated acid solution.

In the technique as described above, a method called phase separation system conversion is used in order to completely separate lignin and cellulose. Specifically, a lignocellulosic composite material is solvated by a phenol compound in advance and then lignocellulosic material is caused to have a contact with acid. As a result, lignin is caused to selectively graft the phenol compound to an acid and cellulose is swollen by an acid, and cellulose is hydrolyzed to separate lignin from cellulose. These methods also include a technique for improving the separation efficiency (Patent Document 3).

Furthermore, Patent Document 2 discloses that lignophenol is used as a component of a compact. According to this disclosure, even after the use of this compact, lignophenol can be collected again by an organic solvent and can be reused because lignophenol can be dissolved in the organic solvent.

PRIOR ART

Patent Document

Patent Document 1: Japanese Unexamined Patent Application Document No. H2-233701
Patent Document 2: Japanese Unexamined Patent Application Document No. H9-278904
Patent Document 3: Japanese Unexamined Patent Application Document No. 2001-131201

SUMMARY OF THE INVENTION

Problem to be Solved by the Invention

In order to obtain a lignin derivative from a lignin-containing material by the above-described structure conversion using the phase separation system conversion, it is desired that the lignin derivative yield, molecular weight, and the rate of combined phenols for example can be controlled to a certain degree. In order to obtain a lignin derivative and carbohydrate in an industrial manner in particular, such a Phase-Separation system plant for botanical resource is required that can provide a continuous treatment for an efficient reaction.

The present invention has been made in view of the above disadvantage. It is an objective of the invention to provide a Phase-Separation system plant for botanical resource and a conversion method by which, in order to convert and separate a lignocellulosic material into a lignin derivative and carbohydrate, a lignin derivative and hydrolyzed carbohydrate can be efficiently and continuously manufactured from a botanical resource, as well as a concentrated acid treatment unit and a concentrated acid treatment method that can be favorably applied to the conversion apparatus and the conversion method.

Means for Solving the Problem

According to a research by the present inventors, in order to separate a lignocellulosic material as a botanical resource to cellulose and a lignin derivative, factors required for the separation and conversion was examined. The inventors have paid attention on an affinity step between lignin and a phenol derivative having a high affinity to lignin and a contact step with an acidic medium that is a component separation medium from a lignin-cellulose composite and that is also a reaction medium. The inventors have reached the present invention by reaching an apparatus configuration for continuously performing the reaction in a mixed solution of an acidic medium also functioning as a reaction medium and a phenol sorped raw material at a predetermined temperature as well as a method by which the derivative obtained through this reaction can be efficiently collected.

In order to achieve the above objective, a present invention provides a concentrated acid treatment unit that introduces a phenol sorped raw material, which was obtained by defatting a botanical resource-derived raw material and then the phenol sorped raw material was obtained from the defatting a botanical resource-derived raw by sorption phenols, changes the phenol sorped raw material to a mixed solution of phenol including a lignophenol derivative and concentrated acid solution including a cellulose hydrolysate, and delivers the mixed solution to a following unit. The concentrated acid treatment unit is composed of a reaction section and an agitation extraction section. The reaction section agitates and mixes the phenol sorped raw material with concentrated acid to cause cellulose included in the phenol sorped raw material to be swollen and converts lignin included in the phenol sorped raw material to lignophenol and further hydrolyze a part of the cellulose. The agitation extraction section performs a treatment to introduce treated liquid sent from the reaction section and adds phenols for extraction thereto to agitate the mixture to thereby allowing lignophenol dispersed in the concentrated acid solution to be dissolved and extracted in the phenols for extraction.

According to the concentrated acid treatment unit, the following configuration is preferred. Specifically, the agitation extraction section introduces the treated liquid sent from the reaction section through the one end-side of a cylindrical extraction container and selects an appropriate one of a plurality of inlets to input the phenols for extraction therethrough. The treated liquid in the container is held back at a plurality of stages and is agitated at the respective holding positions. An appropriate one of a plurality of liquid outlets is selected through which the mixed solution of phenol solution including a lignophenol derivative and concentrated acid solution including a cellulose hydrolysate is sent.

The concentrated acid treatment unit of the present invention is preferably configured so that the reaction section subjects a highly viscous and massive phenol sorped raw material at an initial stage of the agitation to a rolling by a blade tip end of an agitation blade and an inner face of a reactor body for fragmentation. Furthermore, the concentrated acid treatment unit of the present invention is preferably configured so that the reaction section has: the reactor body; a rotation axis provided at the center of the reactor body; a motor for driving and rotating the rotation axis at a high speed; a plurality of agitation blades that are provided at the rotation axis in a radial fashion, that have blade tip ends having a comb-like shape, and that are provided in the vicinity of the inner circumference face of the container; a phenol sorped raw material introduction opening provided at one end-side of the reactor body; and a treated liquid outlet provided at the other end-side of the reactor body so as to provide an agitator structure in which the phenol sorped raw material can be introduced through the introduction opening into the reactor body and the concentrated acid is added and the resultant mixture is agitated and mixed.

According to the concentrated acid treatment unit of the present invention, the agitator has: a cylindrical extraction container for which a shaft axis direction is a vertical direction; a rotation axis provided to extend along the center of the cylindrical extraction container; a motor for driving and rotating the rotation axis; a plurality of flashboards that are provided at the rotation axis, the plurality of flashboards are configured so that an outer diameter is close to an inner face of the tube container and have a small opening for communicating the treated liquid; an extraction agitation blade that is provided at the rotation axis at a position among the flashboards and that agitates the treated liquid among the flashboards; a treated liquid introduction opening provided at the cylindrical extraction container; a plurality of inlets among which an appropriate one is selected to input phenols for extraction therethrough; and a plurality of liquid outlets among which an appropriate one is selected to send mixed solution therethrough. A plurality of agitators is preferably provided so that a treatment can be performed at a single stage or a plurality of stages. A single agitator or an agitator at the most downstream-side among a plurality of agitators is preferably configured as an agitation extraction section for agitating the treated liquid and phenols for extraction.

According to the concentrated acid treatment unit of the present invention, the agitation extraction section is preferably configured by an agitator that includes: a cylindrical extraction container for which a shaft axis direction is a horizontal direction; a rotation axis provided to extend along the center of the cylindrical extraction container; a motor for driving and rotating the rotation axis; a plurality of flashboards that are circular ring plates arranged at an inner wall of the cylindrical extraction container in the shaft axis direction; an extraction agitation blade for agitating the treated liquid among the respective flashboards, the extraction agitation blade is positioned among the respective flashboards and is provided at the rotation axis; a treated liquid introduction opening provided at one end of the cylindrical extraction container; an extraction phenol inlet provided in the middle of the cylindrical extraction container; and a plurality of liquid outlets for sending mixed solution therethrough, the plurality of liquid outlets are provided at the other end of the cylindrical extraction container with different heights.

The Phase-Separation system plant for botanical resource of the present invention includes: a raw material pre-treatment unit for defatting botanical resource-derived raw material by solvent to obtain a phenol sorped raw material obtained by subjecting sorption phenols to sorption; a concentrated acid treatment unit having any of the above configurations; and a collecting unit for subjecting the mixed solution of phenol solution including a lignophenol derivative and concentrated acid solution including a cellulose hydrolysate purified by a concentrated acid treatment step to a liquid-liquid separation to obtain phenol solution including a lignophenol derivative and concentrated acid solution including a cellulose hydrolysate using a difference in specific gravity between the phenol solution and the concentrated acid solution to collect the respective solutions in different tanks.

A method of the present invention is a concentrated acid treatment method that introducing a phenol sorped raw material, which was obtained by defatting a botanical resource-derived raw material and then the phenol sorped raw material was obtained from the defatting a botanical resource-derived raw by sorption phenols, changing the phenol sorped raw material to a mixed solution of phenol including a lignophenol derivative and concentrated acid solution including a cellulose hydrolysate, and delivering the mixed solution to a following unit. The method includes a reaction section and an agitation extraction section. In the reaction section, a phenol sorped raw material is introduced to a reactor body having an agitation blade whose blade tip end is rotated in the vicinity of an inner face of the reactor body. Then, concentrated acid is added and the resultant mixture is agitated and mixed. A highly viscous and massive phenol sorped raw material at an initial stage of the agitation is subjected to a rolling by the blade tip end of the agitation blade and the reactor body inner face for fragmentation so that the cellulose included in the phenol sorped raw material is swollen to convert lignin included in the phenol sorped raw material to lignophenol. Hydrolysis of a part of the cellulose is performed. In the agitation extraction section, phenols for extraction are added to the treated liquid sent from the reaction section to agitate the resultant mixture to thereby allow lignophenol dispersed in the concentrated acid solution to be dissolved and extracted in the phenols for extraction.

The method for Phase-Separation system conversion for botanical resource of the present invention includes: a raw material pre-treatment step; a concentrated acid treatment step; and a collection step. In the raw material pre-treatment step, solvent is added to a stored botanical resource in a raw material pre-treatment unit to agitate the resultant mixture to obtain a defatted raw material. Then, the defatted raw material is added with phenols to agitate the resultant mixture to thereby obtain a phenol sorped raw material. The concentrated acid treatment step includes a reaction section and an agitation extraction section. In the reaction section, the phenol sorped raw material is introduced to a reactor body having an agitation blade whose blade tip end is rotated in the vicinity of an inner face of the reactor body. Then, concentrated acid is added and the resultant mixture is agitated and mixed. A highly viscous and massive phenol sorped raw material at an initial stage of the agitation that is attached to the inner face of the reactor body is crushed by the blade tip end of the agitation blade to thereby cause cellulose included in the phenol sorped raw material to be swollen, thus converting lignin included in the phenol sorped raw material to lignophenol. Hydrolysis of a part of the cellulose is further performed. In the agitation extraction section, the treated liquid is introduced from the reaction section and phenols for extraction is added thereto to agitate the resultant mixture to thereby allow lignophenol dispersed in the concentrated acid solution to be dissolved and extracted in the phenols for extraction. In the collection step, the mixed solution of phenol solution including a lignophenol derivative and concentrated acid solution including a cellulose hydrolysate purified by the concentrated acid treatment step are separated to a liquid-liquid separation to obtain phenol solution including a lignophenol derivative and concentrated acid solution including a cellulose hydrolysate using a difference in specific gravity between the phenol solution and the concentrated acid solution to collect the respective solutions in different tanks.

Effect of the Invention

According to the concentrated acid treatment unit of the present invention, having the reaction section and the agitation extraction section, and the concentrated acid treatment method of the present invention, agitating and mixing a phenol sorped raw material and concentrated acid to cause cellulose included in the phenol sorped raw material to be swollen, thereby converting lignin included in the phenol sorped raw material to lignophenol in the reaction section. Hydrolysis of a part of the cellulose is further performed. In the agitation extraction section, phenols for extraction are added to the treated liquid sent from the reaction section and adds thereto to agitate the resultant mixture to cause lignophenol dispersed in the concentrated acid solution to be dissolved and extracted in the phenols for extraction. Thus, mixed solution of phenol solution including a lignophenol derivative and concentrated acid solution including a cellulose hydrolysate can be generated from a phenol sorped raw material in a smooth manner.

According to the Phase-Separation system plant for botanical resource of the present invention, the use of the concentrated acid treatment unit provides a continuous extraction from a lignocellulosic material as a botanical resource of a useful lignin derivative such as lignophenol to separate sugar.

According to the method for Phase-Separation system conversion for botanical resource of the present invention, since the concentrated acid treatment unit is used, a step of hydrolysis of a lignocelluloses material as a botanical resource by concentrated acid and further adding phenols for extraction thereto for a continuous reaction is continuously performed at a fixed temperature. Thus, a useful lignin derivative such as lignophenol and sugar can be continuously and efficiently manufactured at an ordinary temperature causing less energy consumption.

BRIEF DESCRIPTION OF THE DRAWINGS

FIG. 15 is a cross-sectional view taken along XV-XV in FIG. 14.

MODE FOR CARRYING OUT THE INVENTION

The following section will describe an embodiment of the present invention in detail with reference to the drawings.

First Embodiment

Figure 1:
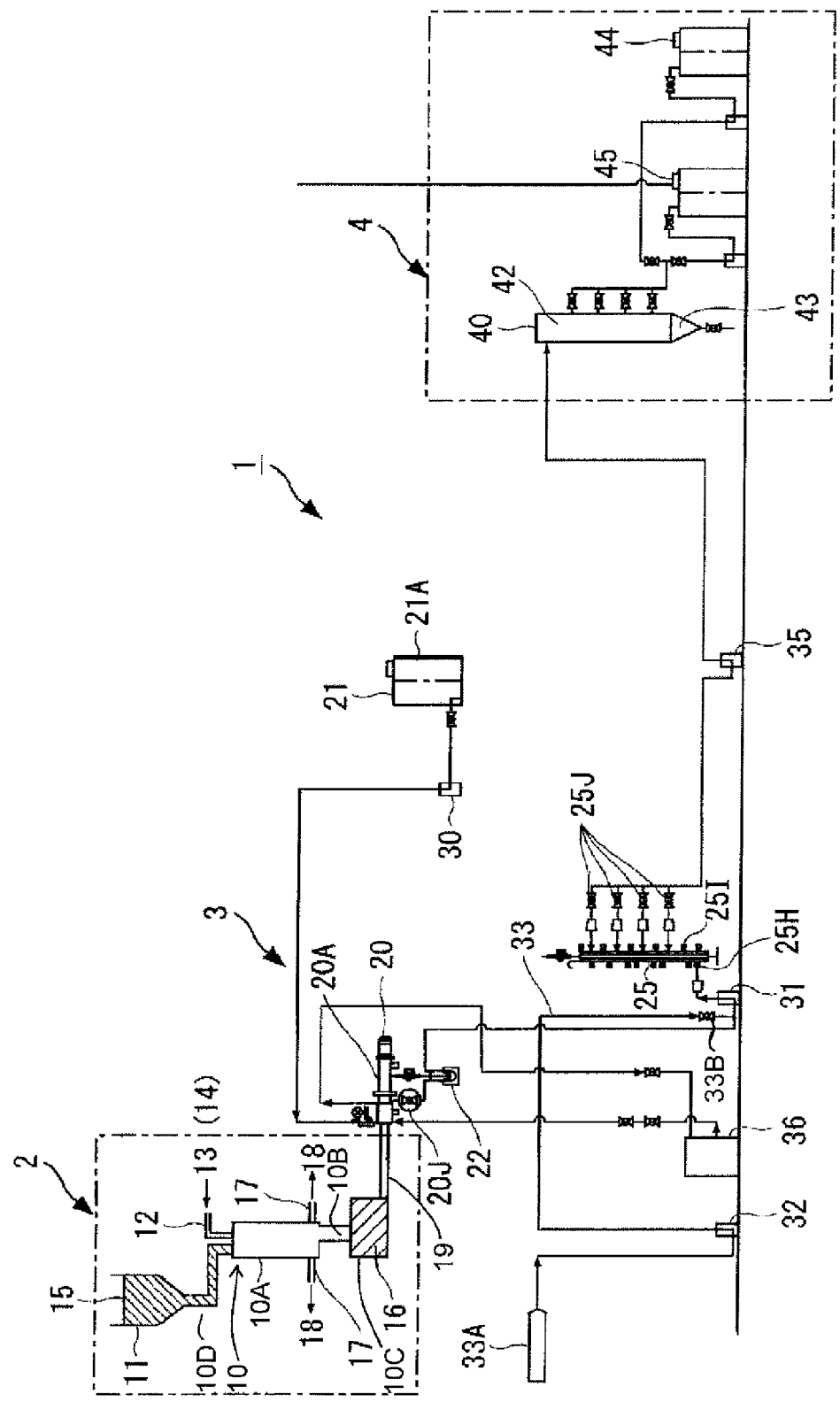
FIG. 1 is a block diagram illustrating the configuration of a Phase-Separation system plant for botanical resource according to the first embodiment of the present invention.

Entire Configuration of Outline of Phase-Separation System Plant for Botanical Resource As shown in FIG. 1, a Phase-Separation system plant for botanical resource 1 is configured to include: a raw material pre-treatment unit 2; a concentrated acid treatment unit 3; and a collecting unit 4.

The raw material pre-treatment unit 2 has an agitation drying tank 10. This agitation drying tank 10 receives, for example, a naturally-dried botanical resource-derived raw material as a lignocellulose composite such as wood meals, grass and flowers, or pulp (hereinafter simply referred to as raw material) 15 and also receives sorption phenols 13 such as cresol and solvent 14 such as acetone or alcohol to solvate lignin in the raw material 15 by the sorption phenols 13 to generate a phenol sorped raw material 16. The term "phenol sorped raw material" is defined as a raw material in which phenols permeated in a lignocellulose composite allows lignin to be solvated by phenol. When phenol is cresol, the term "cresol sorption wood meals" is used.

The concentrated acid treatment unit 3 has a horizontal reaction section 20 and a vertical agitation extraction section 25. This reaction section 20 receives the phenol sorped raw material 16 generated in the raw material pre-treatment unit 2 and also receives concentrated acid 21A sent from a concentrated acid supply section 21 via a solution sending pump 30 to agitate the resultant mixture to react the phenol sorped raw material 16 to a concentrated acid. Then, mixed solution of liquid and a solid matter (the mixed solution at this stage will be hereinafter referred to as treated liquid in particular) is introduced to the agitation extraction section 25 where the treated liquid is added with phenols for extraction 33 and the mixture is agitated, thereby sending mixed solution of phenol solution including a lignophenol derivative and concentrated acid solution including a cellulose hydrolysate.

In the agitation extraction section 25, the treated liquid sent from the reaction section 20 is introduced from one end-side of a cylindrical extraction container 25A. At the same time, an appropriate one of a plurality of inlets 25H is selected for inputting the phenols for extraction therethrough. The treated liquid in the container is held back at a plurality of stages and is agitated at the respective holding positions. An appropriate one of a plurality of liquid outlets 25I is selected to send therethrough the mixed solution of phenol solution including a lignophenol derivative and concentrated acid solution including a cellulose hydrolysate.

The collecting unit 4 has a liquid-liquid separation extractor 40. This liquid-liquid separation extractor 40 receives the mixed solution of phenol solution including a lignophenol derivative and concentrated acid solution including a cellulose hydrolysate purified by the concentrated acid treatment step. Using a difference in specific gravity between the phenol solution and the concentrated acid solution, the mixed solution is subjected to a liquid-liquid separation to thereby obtain a phenol solution including a lignophenol derivative and a concentrated acid solution including a cellulose hydrolysate. These two types of solutions are collected in different tanks, respectively.

The following section will explain the configurations of the raw material pre-treatment unit 2, the concentrated acid treatment unit 3, and the collecting unit 4, respectively.

[Configuration of Raw Material Pre-Treatment Unit 2]

As shown in FIG. 1, the raw material pre-treatment unit 2 is configured to include the agitation drying tank 10. The agitation drying tank 10 is configured to include: a tank body 10A in which raw material is agitated and dried; a stock section 10C connected to a bottom section of the tank body 10A via a delivery duct 10B; an agitation blade (not shown) provided in the tank body 10A; and a driving source (not shown) for driving the agitation blade. Furthermore, the agitation drying tank 10 is configured so that an upper section is connected to a raw material supply feeder 11 for supplying a raw material (wood meals) and a chemical agent supply section 12 functioning as an introduction opening though which the sorption phenols 13 and the solvent 14 are supplied. The agitation drying tank 10 is configured so that a lower section has a chemical agent collecting section 17.

The supply of phenols is for the purpose of phenol sorption. The phenol sorption is carried out to suppress the frequency at which lignin has a contact with acid, when lignin has a contact with acid, and graft the phenol to the benzyl position of lignin that has the highest reaction activity so that phenol is stabilized and can have a higher phenol activity.

Phenols are supplied in an amount that is required to synthesize lignin included in wood meals into a lignophenol derivative. Phenol is used together with solvent.

If phenol is used in the minimum amount and is directly solvated in defatted wood meals, the small amount of liquid causes unevenness. To prevent this, phenol is dissolved in acetone in an amount to allow wood meals to be immersed sufficiently. Then, the solution is added to defatted wood meals. The resultant mixture is agitated to subsequently distill acetone away. This can consequently minimize the amount of phenol used and can allow phenol to be solvated evenly.

A lignophenol derivative is a compound having a 1,1-bis (aryl)propane-2-O-arylether structure in which a phenol derivative is bonded to C1 (benzyl position) of a phenyl propane skeleton.

Phenols may be any of monohydric dihydric, and trihydric phenols. With regard to the hydrophobicity of a lignophenol derivative synthesized by lignin included in wood meals and a phenol derivative, a lignomonophenol derivative (monovalent phenol) has the highest hydrophobicity. Monovalent phenol may include phenol, alkylphenol such as cresol, methoxyphenol, or naphthol for example. Thus, a hydrophobic compact is preferably synthesized using cresol as monovalent phenol.

When the agitation drying tank 10 receives the raw material 15 (naturally-dried wood meals in this case) and the solvent 14 (acetone in this case), agitation is performed therein. As a result, the raw material 15 is defatted. Thereafter, the agitation drying tank 10 receives solution composed of the sorption phenols 13 (cresol in this case) and the solvent 14 and a further agitation is performed therein. This consequently allows lignin in the raw material 15 to be solvated by sorption phenols. The raw material 15 preferably has a size of about 20 to 80 mesh for a sufficient sorption of cresol, more preferably has a size of about 20 to 60 mesh.

Thereafter, acetone can be distilled away to thereby obtain wood meals in which phenols are absorbed (i.e., the phenol sorped raw material 16).

Collected chemical agent 18 (already-used solvent and sorption phenols) that was used in the agitation drying tank 10 and that was collected by the chemical agent collecting section 17 can be reused through separation and purification. This can consequently reduce the amount of the solvent 14 used.

[Configuration of Concentrated Acid Treatment Unit 3]

The concentrated acid treatment unit 3 receives the phenol sorped raw material 16 generated by the raw material pretreatment unit 2 and also receives the concentrated acid 21A sent from the concentrated acid supply section 21 via the solution sending pump 30 to agitate the resultant mixture to react the phenol sorped raw material 16 to a concentrated acid to thereby obtain mixed solution of liquid and a solid matter (the mixed solution at this stage will be hereinafter referred to as treated liquid in particular).

This concentrated acid treatment unit 3 is configured to include: the reaction section 20 that receives the phenol sorped raw material 16 treated by the agitation drying tank 10 and sent through a delivery path 19; the concentrated acid supply section 21 that stores therein concentrated acid (e.g., concentrated sulfate) to supply a fixed amount of concentrated acid to the reaction section 20; an agitation buffer bath 22 that receives treated liquid of liquid and a solid matter treated by and sent from the reaction section 20 to subject the treated liquid to agitation for a predetermined time; and the agitation extraction section 25 that receives the treated liquid sent from the agitation buffer bath 22 and that receives phenols for extraction to agitated the resultant mixture to thereby obtain mixed solution of phenol solution including a lignophenol derivative and concentrated acid solution including a cellulose hydrolysate.

Figure 2:
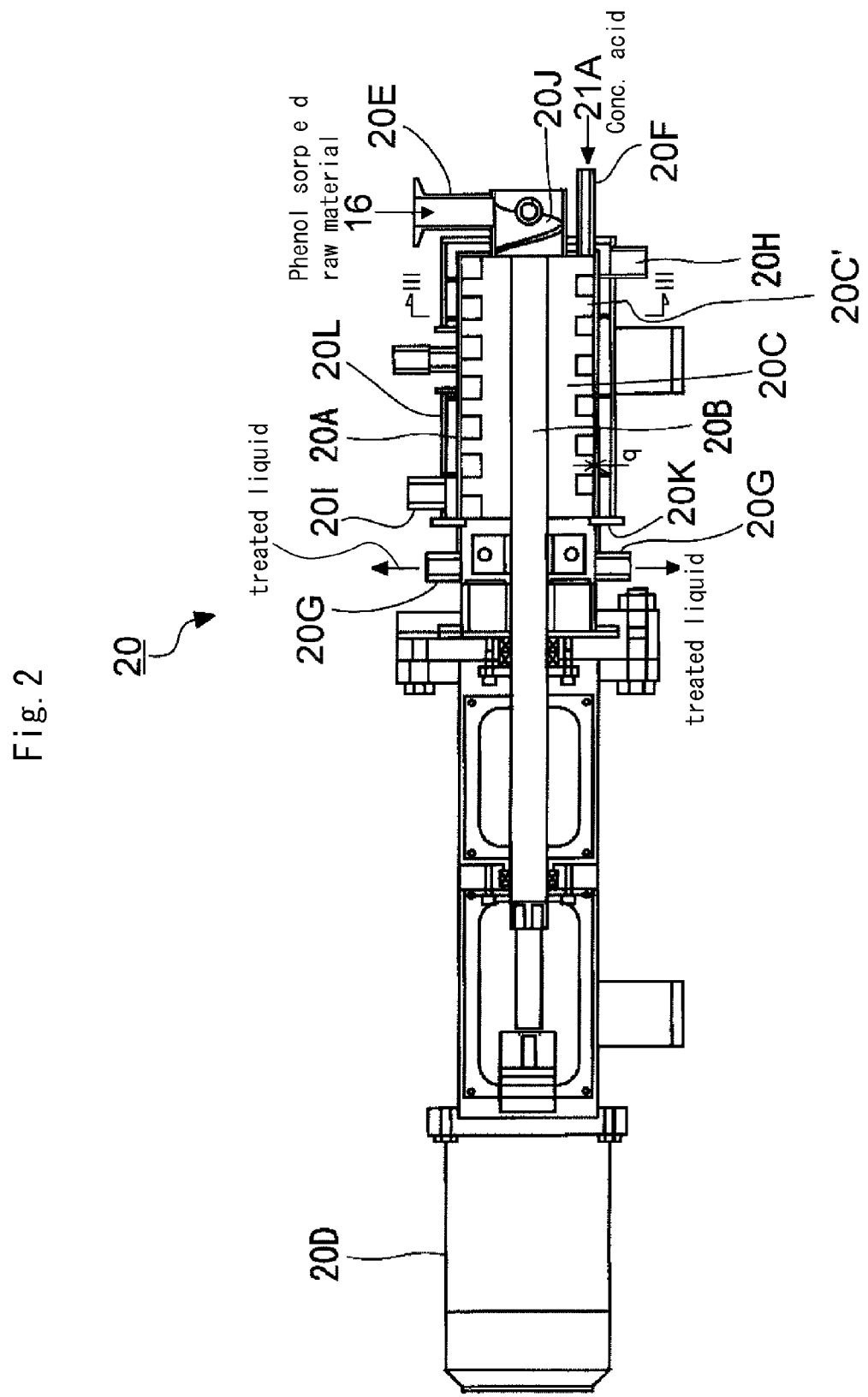
FIG. 2 is a schematic cross-sectional view illustrating the configuration of a reaction section of the conversion apparatus of FIG. 1.

As shown in FIG. 2, the reaction section 20 is composed of the reaction section body 20A; a motor 20D; a rotation axis 20B rotated by the motor 20D; a pressure feeding blade 20J and an agitation blade 20C fixed to the rotation axis 20B; a phenol sorped raw material inlet 20E and a treated liquid outlet 20G; and a concentrated acid inlet 20E.

The reaction section 20 receives the phenol sorped raw material 16 treated by and sent from the agitation drying tank 10 through the inlet 20E and receives, by the solution sending pump 30, the concentrated acid 21A stored in the concentrated acid supply section 21 through the inlet 20E. 65 to 72 weight % Concentrated acid is preferable, for example. Another configuration also may be used where the phenol sorped raw material 16 treated by the respective plurality of agitation drying tanks 10 is stored and collected and then the collected phenol sorped raw material 16 is collectively inputted to a hopper through which the phenol sorped raw material 16 is supplied to the reaction section 20.

In the reaction section 20, the phenol sorped raw material 16 flowed into the body 20A through the inlet 20E and the concentrated acid 21A flowed into the body 20A through the inlet 20E are agitated by the rotation of the agitation blade 20C. Then, the phenol sorped raw material 16 (phenol sorption wood meals) is hydrolyzed by the concentrated acid 21A, thereby resulting in the treated liquid in which liquid is mixed with a solid matter. A blade tip end 20C' of the agitation blade 20C and the inner circumference face of the reactor body 20A have therebetween a clearance q that is reduced to 1 mm for example. The reason is that, the phenol sorped raw material, which is highly viscous and massive at an initial stage of the agitation, is rolled for fragmentation by the blade tip end of the agitation blade and the inner face of the reactor body 20A.

The body 20A of the reaction section 20 is surrounded by a cooling mechanism having a cooling water inlet 20H and a cooling water outlet 20I. By this cooling mechanism, cooling water sent from a chiller unit 36 (see FIG. 1) is introduced through the cooling water inlet 20H and is allowed to flow in the cooling mechanism and then is sent through the cooling water outlet 20I. This consequently cools the body 20A to a temperature equal to or higher than 20 degrees C. and lower than 40 degrees C. The reason why the temperature for hydrolysis is equal to or higher than 20 degrees C. and lower than 40 degrees C. is that a temperature equal to or higher than 40 degrees C. excessively promotes the reaction and thus is not preferred. A temperature lower than 20 degrees C. on the other hand causes the treated liquid, which is mixed solution of the phenol sorped raw material 16 and a solid content, to have an increased viscosity or to be solidified and thus is not preferred.

In the reaction section 20, the phenol sorped raw material 16 and the concentrated acid 21A are agitated and reacted to cause cellulose included in the phenol sorped raw material 16 swollen. As a result, the mixed liquid has a high viscosity at an initial stage of the agitation. The swollen cellulose is hydrolyzed by the concentrated acid 21A to hydrolysis, and thereby causes the mixed liquid to have a lower viscosity. Since the reaction section 20 has the agitation blade 20C at the body 20A that is rotated by the motor 20D, the reaction of the phenol sorped raw material 16 with the concentrated acid 21A is promoted and an initial kneading efficiency is improved.

Thus, in the reaction section 20, the agitated phenol sorped raw material 16 is hydrolyzed by the concentrated acid 21A. At the same time, lignin separated from the phenol sorped raw material 16 is phenolated at an active side chain benzyl position and is converted to lignophenol.

Figure 4:
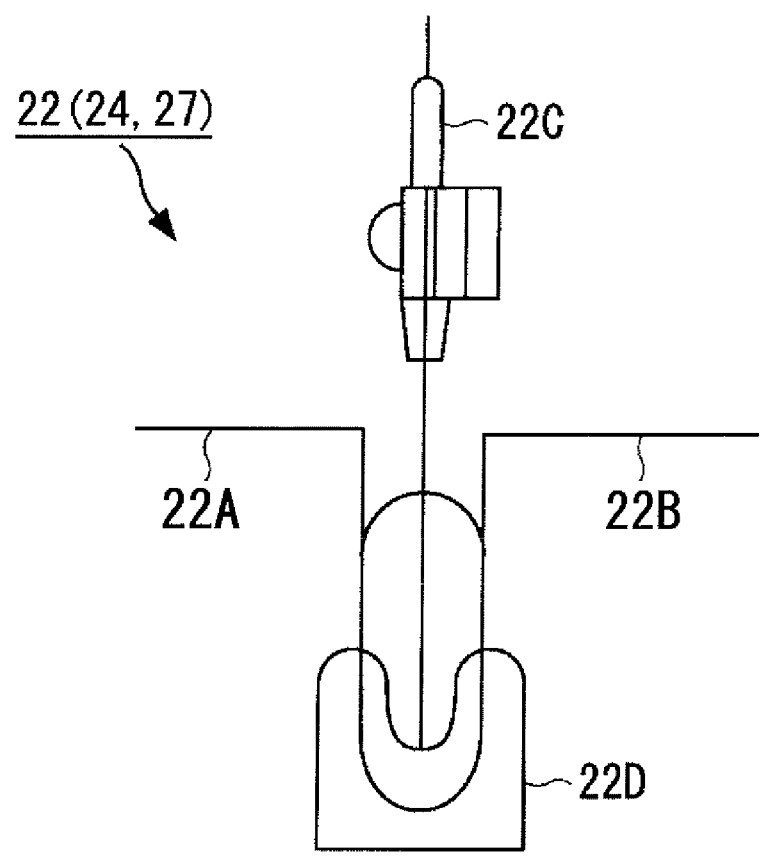
FIG. 4 is a schematic view illustrating the configuration of an agitation buffer bath of the conversion apparatus of FIG. 1.

In the reaction section 20, when the amount of the phenol sorped raw material 16 treated with the concentrated acid reaches a predetermined amount, an on-off valve 20J is opened to send the phenol sorped raw material 16 to the agitation buffer bath 22. As shown in FIG. 4, the agitation buffer bath 22 is composed of a bath body (container with no reference numeral); an inlet 22A, an outlet 22B, a liquid level sensor 22C, and a temperature controller 22D provided in this bath body. The temperature controller 22D is configured to include a heater for example to control the temperature to the temperature of about 20 degrees C. to 40 degrees C.

By the agitation buffer bath 22, the treated liquid sent from the reaction section 20 is stored in the bath body through the inlet 22A and the liquid level of the treated liquid is monitored by the liquid level sensor 22C and the temperature of the treated liquid is retained at a fixed temperature by the temperature controller 22D.

A solution sending pump 31 shown in FIG. 1 continuously sends solid-liquid mixed solution of a kneaded matter, which is stored in the bath body of the agitation buffer bath 22 and which is composed of the phenol sorped raw material 16 and the concentrated acid 21A for example, through the outlet 22B to the agitation extraction section 25 so that the mixed solution can always have a fixed liquid level.

In this manner, the agitation buffer bath 22 functions to effectively prevent the solidification of the solid-liquid mixed solution caused in the interior of a piping in the case of a low temperature for example.

As shown in FIG. 1, the solution sending pump 31 continuously sends the treated liquid in the agitation buffer bath 22 to the agitation extraction section 25. A solution sending pump 32 sends the phenols for extraction (cresol) 33 stored in a tank 33A via an on-off valve 33B to the agitation extraction section 25. The phenols for extraction 33 are solvent used to extract lignophenol that is converted from lignin and that exists in the liquid treated with concentrated acid.

Figure 5:
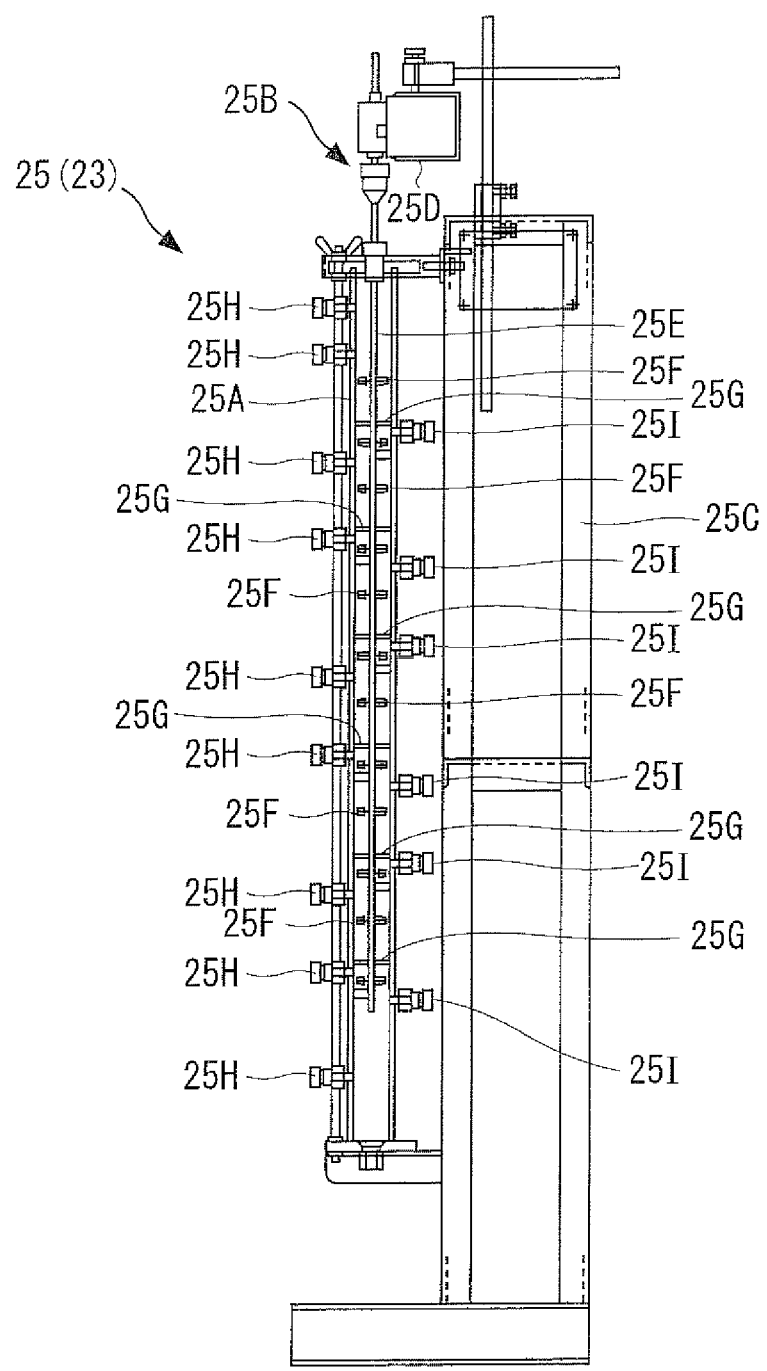
FIG. 5 is a schematic view illustrating the configuration of an agitation extraction section of the conversion apparatus of FIG. 1.

As shown in FIG. 5, the agitation extraction section 25 is configured to include the mixing container 25A that is a tube container extending in an up-and-down direction, and an agitation mechanism 25B for the agitation in the container.

The mixing container 25A is supported by a base 25C. The agitation mechanism 25B includes a rotation axis 25E that is driven by a motor 25D provided exterior to the mixing container 25A. The rotation axis 25E includes, in an order from the upper section-side to the lower section-side, a plurality of rotation blades (extraction agitation blades) 25F and a plurality of partition plates (flashboards) 25G that are arranged alternately.

Figure 6:
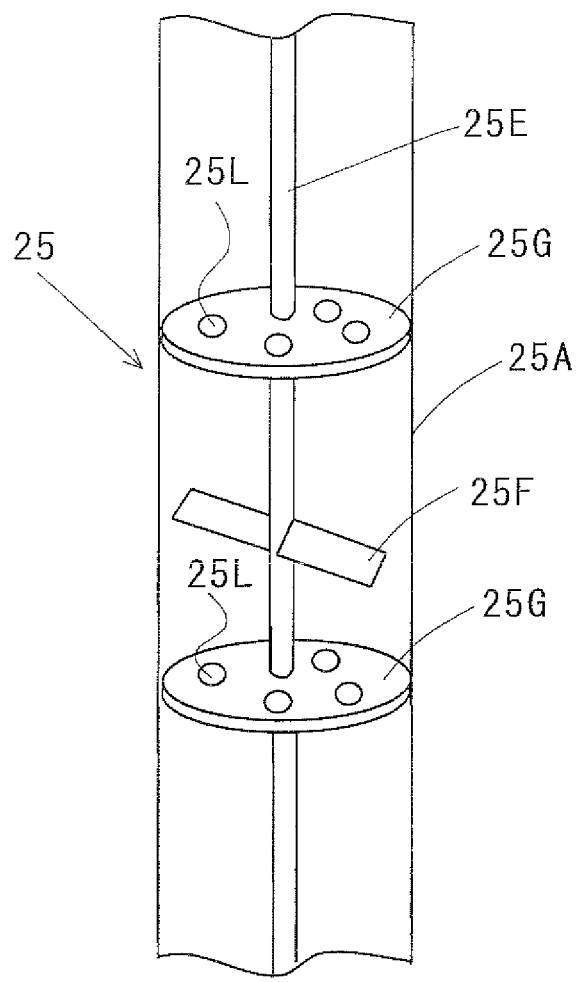
FIG. 6 is a schematic partial cross-sectional view illustrating the configuration of a separation extractor of the conversion apparatus of FIG. 1.

As shown in FIG. 6, the partition plate (flashboard) 25G is shaped like a circular disc having a plurality of holes 25L. The partition plate 25G has a structure in which the cylindrical space of the mixing container 25A is substantially blocked by the plane that is vertical to the cylindrical axis line. The sizes and numbers of the holes 25L can be set depending on the type of the phenol sorped raw material 16 subjected to a sulfate treatment. The rotation blade 25F and the partition plate 25G are made of material that is not dissolved in concentrated acid and phenols. The rotation blade 25F can be made of material such as fluoroplastic.

As shown in FIG. 5, the agitation extraction section 25 includes a plurality of inlets 25H and a plurality of outlets 25I. An on-off valve 25J (see FIG. 1) is provided to correspond to the each outlet 25I.

The plurality of inlets 25H are provided in a region from the upper section to the lower section of the mixing container 25A. The plurality of inlets 25H are used, for example, to introduce the treated liquid (mixed solution of the phenol sorped raw material 16 and the concentrated acid 21A) sent from the agitation buffer bath 22 through the inlet 25H at the lowermost position. Any of the inlets 25H at the intermediate and upper positions is used to input the phenols for extraction 33.

As shown in FIG. 1, in the agitation extraction section 25, the motor 25D is used to rotate the rotation blade 25F to agitate the phenol sorped raw material 16 treated with the concentrated acid introduced through the inlet 25H at the lower position of the mixing container 25A and the phenols for extraction 33 during which, as shown in FIG. 6, the mixture is allowed to sequentially pass through the holes 25L of the partition plate 25G at the upper side of the mixing container 25A through the holes 25L of partition plate 25G.

If the inlet 25H other than the one at the lowermost position of the agitation extraction section 25 is selected and the phenols for extraction 33 is introduced through the selected inlet, the longer the time is required for the phenol sorped raw material 16 and the concentrated acid 21A to reach the upper position inlet and to be introduced. During this time required for the phenol sorped raw material 16 and the concentrated acid 21A to reach, the reaction of the mixed solution of the phenol sorped raw material 16 and the concentrated acid 21A is promoted. Thus, the reaction time for acid treatment prior to the lignophenol extraction by the phenols for extraction 33 can be controlled, thus improving the separation efficiency. When the raw material is wood for example, the phenols for extraction 33 may be introduced through the upper-side inlet 25H in order to extend the reaction time for acid treatment to promote the decomposition. When the raw material is grass plant or pulp and the acid treatment is sufficiently carried out by the reaction section 20, the phenols for extraction 33 may be introduced through the lower-side inlet 25H.

The agitation extraction section 25 includes the plurality of inlets 25H from the upper side to the lower side of the mixing container 25A and also includes the plurality of outlets 25I. The existence of the respective plurality of inlets 25H and outlets 25I can allow, depending on the biomass material (raw material 15), appropriate inlet 25H and outlet 25I to be selected, thus controlling the reaction time for acid treatment prior to the lignophenol extraction and the lignophenol extraction time. Specifically, the existence of the plurality of inlets 25H and outlets 25I can provide a plurality of combinations of selected inlet 25H and outlet 25I, thus controlling the total reaction time in a minute manner. When the raw martial is a grass plant for example, the phenols for extraction 33 can be inputted through the lower-side inlet 25H to subsequently output the treated liquid through the outlet 25I lower than the middle side, thereby reducing the total treatment time.

Until the phenols for extraction 33 are inputted to the agitation extraction section 25, sorption phenols mixed by the agitation drying tank 10 are already bonded to lignin in the treated liquid and are already converted to lignophenol. Thus, a very few amount of sorption phenols exists therein and substantially little phenols as solvent exist. Lignophenol is surrounded by concentrated acid without being dissolved therein. Thus in the agitation extraction section 25, the phenols for extraction 33 is added thereto to extract lignophenol. When the phenols for extraction 33 is inputted to the agitation extraction section 25, agitation causes the phenols for extraction 33 to have a contact with lignophenol surrounded by concentrated acid. Then, phenols for extraction 33 are dissolved and, thus realizing the extraction from concentrated acid.

After the input of the phenols for extraction 33 to the agitation extraction section 25, the agitation extraction section 25 includes therein mixed liquid containing lignophenol and phenols, and carbohydrate liquid containing concentrated acid and cellulose decomposed by concentrated acid.

Thus, the agitation extraction section 25 allows the treated liquid sent from the reaction section 20 to be introduced through one end-side of the cylindrical extraction container 25A. At the same time, an appropriate one from among the plurality of inlets 25H of the agitation extraction section 25 is selected to input the phenols for extraction and to hold back the treated liquid in the container at a plurality of stages and then to agitate the treated liquid at the respective holding positions. Then, the agitation extraction section 25 selects an appropriate one from among the plurality of liquid outlets 25I of the agitation extraction section 25 is selected to sent the mixed solution of phenol solution including a lignophenol derivative and concentrated acid solution including a cellulose hydrolysate.

As described above, in the agitation extraction section 25 agitates, the treated liquid sent from the agitation buffer bath 22 and the phenols for extraction (cresol) 33 are agitated, thereby providing the mixed solution of phenol solution including a lignophenol derivative and concentrated acid solution including a cellulose hydrolysate. After the phenol sorped raw material 16 and the phenols for extraction 33 for a predetermined time in the agitation extraction section 25, through the opened on-off valve 25J as shown in FIG. 1, the solution sending pump 35 sends the mixed solution treated by the agitation extraction section 25 to the liquid-liquid separation extractor 40 of the collecting unit 4 (which will be described later).

[Configuration of Collecting Unit 4]

As shown in FIG. 1, the collecting unit 4 is configured to include: the liquid-liquid separation extractor 40; a phenol solution collection tank 44; and a concentrated acid solution collection tank 45.

Figure 7:
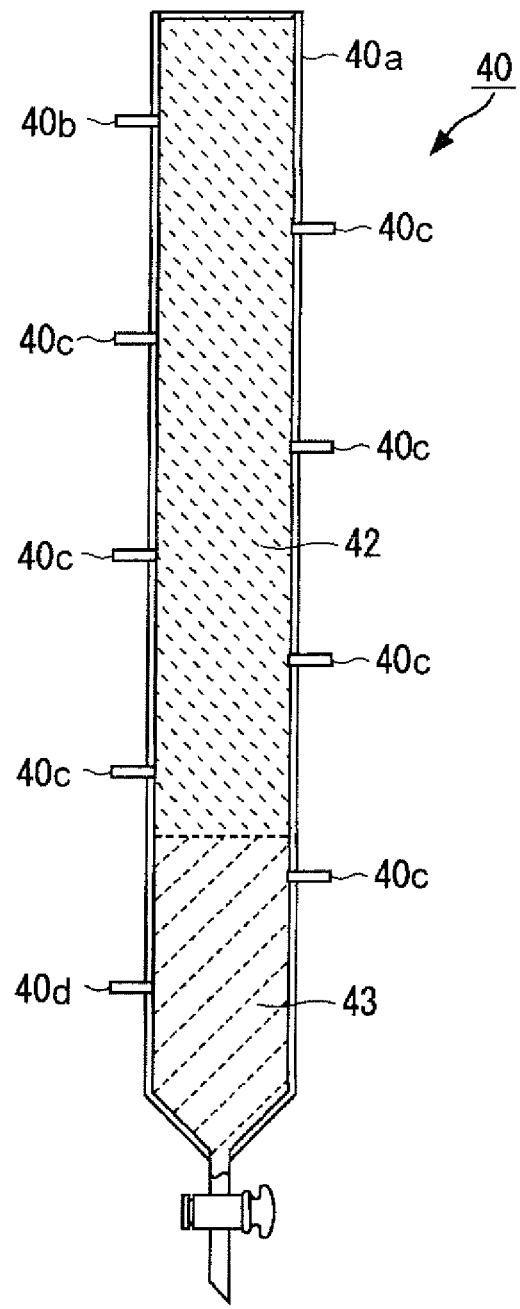
FIG. 7 is a schematic partial cross-sectional view illustrating the configuration of a liquid-liquid separation extractor of the conversion apparatus of FIG. 1.

As shown in FIG. 7, the liquid-liquid separation extractor 40 is configured to include, for example, a vertically-long tube container 40a that is made of glass or resin for example and that has a sealed structure. The uppermost part of the tube container 40a has a raw material supply opening 40b for a lignin layer and a concentrated acid layer. The upper side has a plurality of light liquid discharge outlets 40c. The lower side has a heavy liquid discharge outlet 40d.

In the liquid-liquid separation extractor 40, the lignin layer 42 of a light liquid (a layer containing lignophenol and the phenols for extraction 33) moves to the upper side, and the concentrated acid layer 43 of heavy liquid (a layer containing carbohydrates composed of cellulose decomposed by sulfate for example) moves to the lower side. The lignin layer 42 is immediately extracted through the plurality of light liquid discharge outlets 40c and is stored in the phenol solution collection tank 44.

The concentrated acid layer 43 that is heavy liquid and that settles down on the other hand can be collected through the heavy liquid discharge outlet 40d (or a lower cock) at the lower side of the liquid-liquid separation extractor 40 into the concentrated acid solution collection tank 45. By continuously subjecting this concentrated acid layer 43 to a further diluted solution treatment, carbohydrates included in the concentrated acid layer 43 can be converted to sugars useful as an industrial raw material.

According to the Phase-Separation system plant for botanical resource 1 of the embodiment of the present invention, a continuous reaction can be carried out at a temperature of about 30 degrees C. for a short time. Thus, a botanical resource composed of a lignocellulosic composite can be separated to lignophenol and low-molecular-weight carbohydrates with a low energy and for a short time.

Second Embodiment

Figure 8:
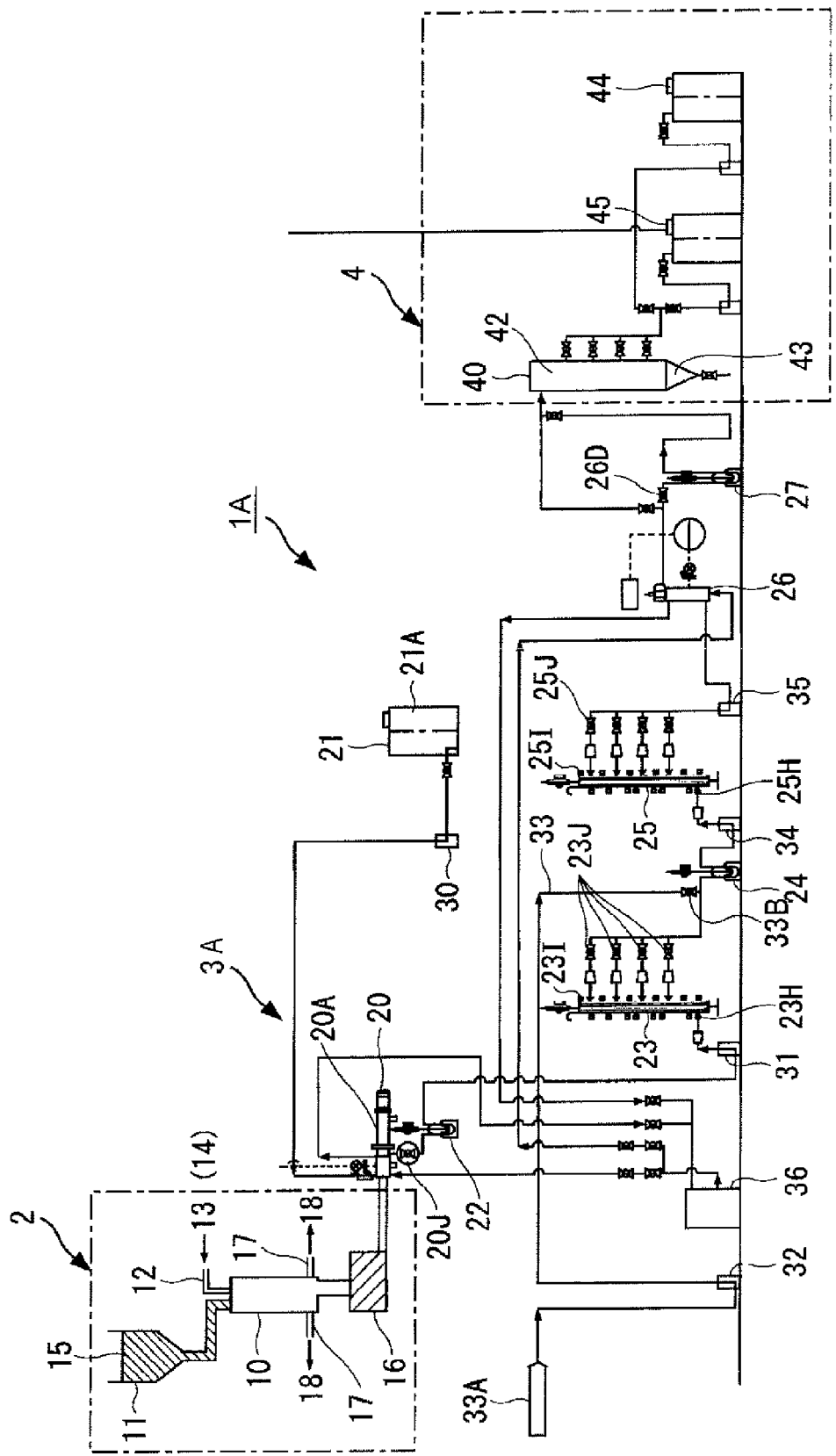
FIG. 8 is a block diagram illustrating the configuration of a Phase-Separation system plant for botanical resource according to the second embodiment of the present invention.

Entire Configuration of Outline of Phase-Separation System Plant for Botanical Resource As shown in FIG. 8, a Phase-Separation system plant for botanical resource 1A is composed of: the raw material pre-treatment unit 2; a concentrated acid treatment unit 3A for subjecting, to a concentrated acid treatment, the raw material subjected to a pre-treatment supplied from the raw material pre-treatment unit 2; and the collecting unit 4 for collecting lignophenol separated by this concentrated acid treatment unit 3A. The second embodiment is different from the Phase-Separation system plant for botanical resource 1 shown in FIG. 1 in the configuration of the concentrated acid treatment unit 3A.

[Configuration of Concentrated Acid Treatment Unit 3a]

The concentrated acid treatment unit 3A is configured to include: the reaction section 20; the concentrated acid supply section 21; the first agitation buffer bath 22; a first agitation extraction section 23; a second agitation buffer bath 24; the second agitation extraction section 25; an oscillating reactor 26; and a third agitation buffer bath 27.

The reaction section 20 has a configuration that has the same structure and function as those of the reaction section 20 of the Phase-Separation system plant for botanical resource 1 shown in FIG. 1 and FIG. 2 and thus it is not described further with reference to FIG. 2. The first agitation buffer bath 22, the second agitation buffer bath 24, and the third agitation buffer bath 27 have the same structure and function as those of the agitation buffer bath 22 of FIG. 4 and thus it is not described further with reference to FIG. 4. The first agitation extraction section 23 has the same structure and function as those of the agitation extraction section 25 shown in FIG. 5 and it is not described further with reference to FIG. 5.

In the first agitation extraction section 23, the phenol sorped raw material 16 treated with a concentrated acid is introduced through a lower inlet 23H of the mixing container. An outlet 23I includes an on-off valve 23J. Thus, the phenol sorped raw material 16 treated with the concentrated acid is agitated by the first agitation extraction section 23 for a predetermined time and is subsequently introduced to the second agitation buffer bath 24 via the on-off valve 23J. When the raw material is hard wood for example, the first agitation extraction section 23 can be provided in an auxiliary manner to provide a longer reaction time for acid treatment to thereby promote hydrolysis.

The second agitation buffer bath 24 receives the phenol sorped raw material 16 treated with a concentrated acid and also receives the phenols for extraction 33 sent via the on-off valve 33B. The phenols for extraction 33 are supplied from the tank 33A. The phenol sorped raw material 16 treated with a concentrated acid and the phenols for extraction 33 are agitated in the second agitation buffer bath 24 and are subsequently sent to the second agitation extraction section 25 via a solution sending pump 34.

The second agitation extraction section 25 receives the phenol sorped raw material 16 treated with a concentrated acid and the phenols for extraction 33 through the lower inlet 25H of the tube container.

In the oscillating reactor 26, the phenol sorped raw material 16 treated with the concentrated acid is further reacted to the phenols for extraction 33.

Figure 9:
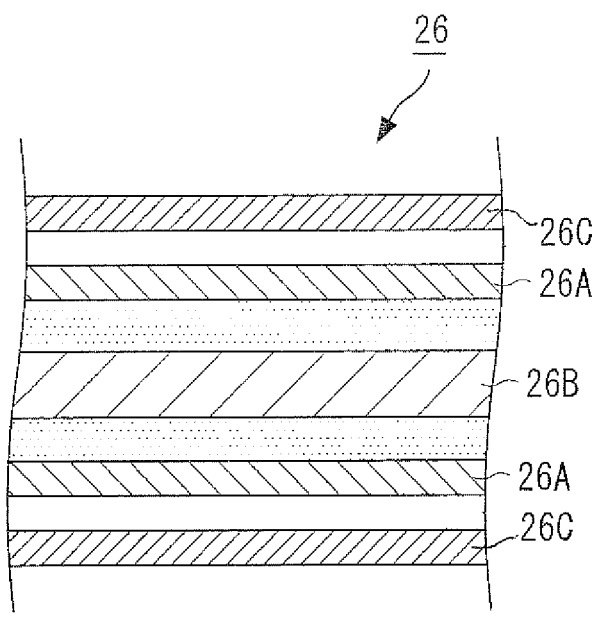
FIG. 9 is a schematic partial cross-sectional view illustrating an oscillating reactor of the conversion apparatus of FIG. 8.

As shown in FIG. 9, the oscillating reactor 26 is structured so that an ultrasonic transducer 26B is inserted in a tube section 26A functioning as a flow path. The tube section 26A has, at the outer periphery thereof, a cooling piping 26C. By this cooling piping 26C, the interior of the tube section 26A is cooled to a predetermined temperature, thus suppressing an unnecessary modification of lignin and the concentrated acid 21A. In this case, the cooling temperature is preferably 30 degrees C. or lower. The interior of the tube section 26A is cooled by the cooling water sent from the chiller unit 36 (see FIG. 1). By the ultrasonic treatment, for carrying out a liquid-liquid separation in the collecting unit 4 (which will be described later), the solubilization of carbohydrates into the sulfate layer and the solubilization of lignophenol into the solvent of the phenols for extraction 33 can be promoted, thus improving the separation of carbohydrates and lignophenol.

When the amount of the phenol sorped raw material 16 treated by the oscillating reactor 26 reaches a predetermined treatment amount, then the phenol sorped raw material 16 is sent via an on-off valve 26D and the third agitation buffer bath 27 to the liquid-liquid separation extractor 40. The third agitation buffer bath 27 has the same configuration as that of the first agitation buffer bath 22. The third agitation buffer bath 27 includes a liquid level sensor for monitoring a liquid level and a temperature controller for controlling the temperature of the mixed solution to a fixed temperature. As a result, the lignin layer and the concentrated acid layer, which the reaction is promoted in the oscillating reactor, 26 are kept at the same predetermined temperature as that of the first agitation buffer bath 22. Also the third agitation buffer bath 27 can always have kept liquid level, thus continuously sending the material to the liquid-liquid separation extractor 40.

According to the Phase-Separation system plant for botanical resource 1A of the second embodiment of the present invention, a continuous reaction can be carried out at a temperature of about 30 degrees C. and for a short time. Thus, a botanical resource of a lignocellulosic composite can be separated to lignophenol and low-molecular-weight carbohydrates with a low energy and for a short time. Compared with the Phase-Separation system plant for botanical resource 1 shown in FIG. 1, the Phase-Separation system plant for botanical resource 1A as shown in FIG. 8 additionally includes the first agitation extraction section 23 and the oscillating reactor 26. Thus, when a biomass such as plants is used, large-sized wood meals of softwood or hardwood for example or hard wood meals can be treated efficiently.

The reaction section 20, the first agitation extraction section 23, and the oscillating reactor 26 of the concentrated acid treatment unit 3 have, at the outlet-side thereof, the first to third agitation buffer baths 22, 24, and 27, respectively. Thus, the solid-liquid mixed solution, which is a kneaded matter composed of the phenol sorped raw material 16 and the concentrated acid 21A for example, can always have kept liquid level and a predetermined temperature and can be transported through the piping of the apparatus. This can effectively prevent the solidification of the solid-liquid mixed solution for example caused in the piping at a low temperature for example.

Since the first agitation extraction section 23 mixes the phenol sorped raw material 16 with the concentrated acid 21A, the hydrolysis reaction of carbohydrates can be promoted effectively.

In the second agitation extraction section 25, a phenol derivative such as the phenols for extraction 33 is added to the mixed solution of the phenol sorped raw material 16 and the concentrated acid 21A to extract lignophenol. In this case, the second agitation extraction section 25 may have the plurality of inlets 25H and outlets 25I to thereby control a lignophenol extraction time for example depending on the raw material of the phenol sorped raw material 16 or a type of lignophenol, thus improving the separation efficiency of the lignin layer 42 and the concentrated acid layer 43.

Furthermore, by providing the oscillating reactor 26, the reaction can be further promoted to thereby separate the lignin layer from the concentrated acid layer effectively.

Third Embodiment

Figure 10:
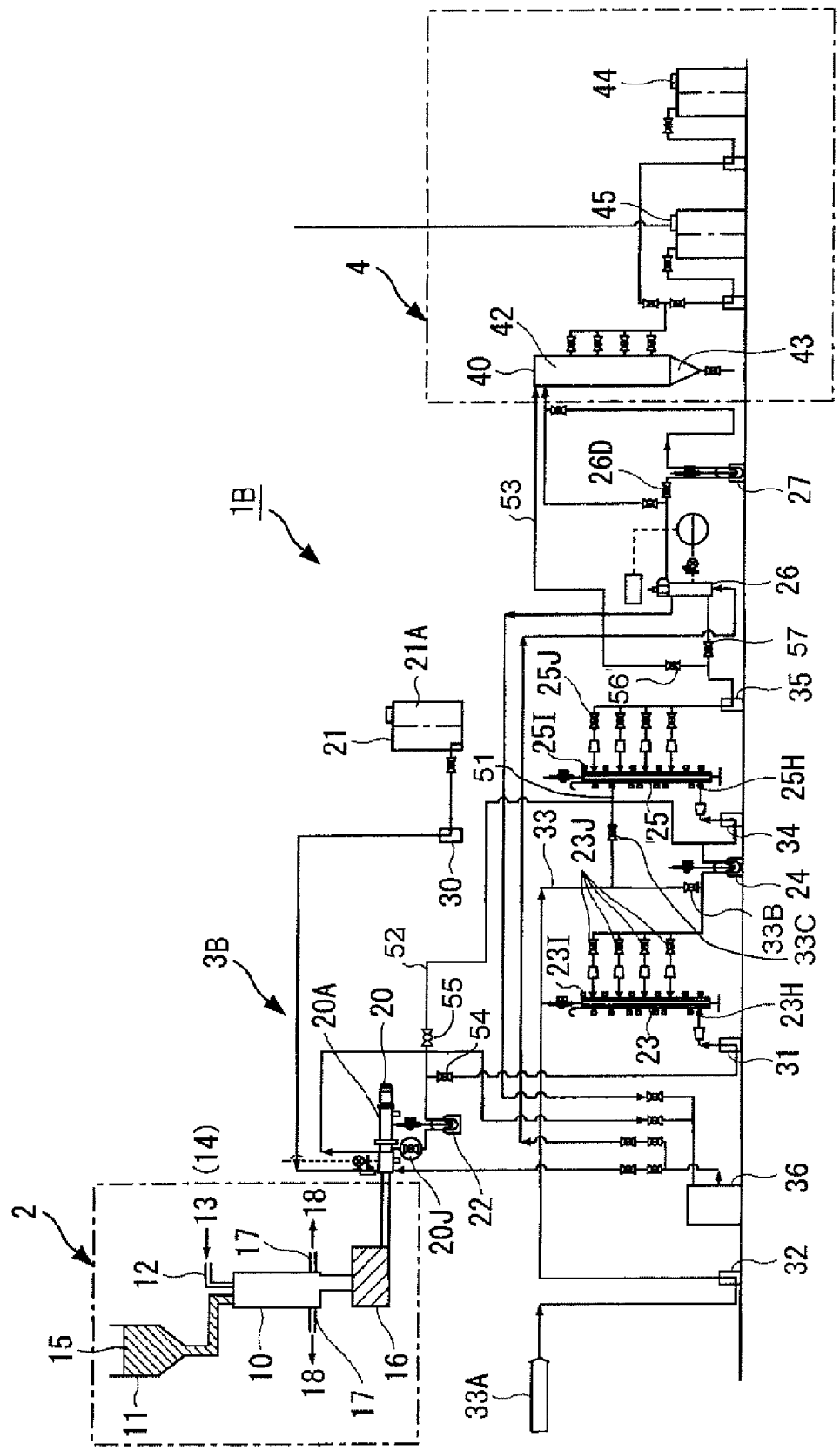
FIG. 10 is a block diagram illustrating the configuration of a Phase-Separation system plant for botanical resource according to the third embodiment of the present invention.

Entire Configuration of Outline of Phase-Separation System Plant for Botanical Resource As shown in FIG. 10, a Phase-Separation system plant for botanical resource 1B according to the third embodiment is composed of: the raw material pre-treatment unit 2; a concentrated acid treatment unit 3B for subjecting the raw material, which is supplied from the raw material pre-treatment unit 2, to a concentrated acid treatment; and the collecting unit 4 for collecting lignophenol separated by this concentrated acid treatment unit 3B.

[Configuration of Concentrated Acid Treatment Unit 3b]

As shown in FIG. 10, the concentrated acid treatment unit 3B has a configuration that newly includes first to third bypass lines 51, 52, and 53 in addition to the configuration of the concentrated acid treatment unit 3A of the second embodiment shown in FIG. 8.

Specifically, the concentrated acid treatment unit 3B is configured to include: the reaction section 20; the concentrated acid supply section 21; the first agitation buffer bath 22; the first agitation extraction section 23; the second agitation buffer bath 24; the second agitation extraction section 25; the oscillating reactor 26; and the third agitation buffer bath 27. The concentrated acid treatment unit 3B further includes: the first bypass line 51 having an on-off valve 33C through which the phenols for extraction 33 are introduced to the inlet 25H of the second agitation extraction section 25 without passing through the second agitation buffer bath 24; the second bypass line 52 having on-off valves 54 and 55 through which the treated liquid sent from the first agitation buffer bath 22 is introduced to the inlet 25H of the second agitation extraction section 25 without passing through the first agitation extraction section 23; and the third bypass line 53 having on-off valves 56 and 57 through which the mixed liquid sent from the second agitation extraction section 25 is introduced to the liquid-liquid separation extractor 40 without passing through the oscillating reactor 26.

When the first bypass line 50 is used, the on-off valve 33B is closed and the on-off valve 33C is opened to thereby introduce the phenols for extraction 33 via the on-off valve 33C to the inlet 25H of the second agitation extraction section 25. If the second agitation extraction section 25 has the plurality of inlets 25H, the phenols for extraction 33 may also be inputted through an introduction opening provided in a range from the middle to the upper side.

When the second bypass line 52 is used, the on-off valve 54 is closed and the on-off valve 55 is opened to input, the treated liquid from the reaction section 20 and the phenols for extraction 33 are introduced to the second agitation extraction section 25, and lignophenol is extracted. The configuration as described above results reducing the treatment time when the botanical resource is a raw material of grass plant or pulp for example.

When the third bypass line 53 is used, the on-off valve 57 is closed and the on-off valve 56 is opened to thereby send the treated liquid in the second agitation extraction section 25 to the liquid-liquid separation extractor 40. The configuration as described above results further reducing the treatment time when the botanical resource is a raw material of grass plant or pulp for example.

In the Phase-Separation system plant for botanical resource 1B, both of the second bypass line 52 and the third bypass line 53 are used, the concentrated acid treatment unit 3B is composed of the reaction section 20, the first agitation buffer bath 22, and the second agitation extraction section 25.

The Phase-Separation system plant for botanical resource 1B has the same configuration as that of the Phase-Separation system plant for botanical resource 1 of FIG. 1.

According to the Phase-Separation system plant for botanical resource 1B, the second bypass line 52 and the third bypass line 53 are used depending on a botanical resource. Thus, a single apparatus can be used to treat the botanical resource regardless of whether the botanical resource is wood, grass, or pulp. Furthermore, the treatment time required for the acid treatment and the lignophenol extraction by the phenols for extraction 33 also can be changed depending on the botanical resource.

Fourth Embodiment

Figure 11:
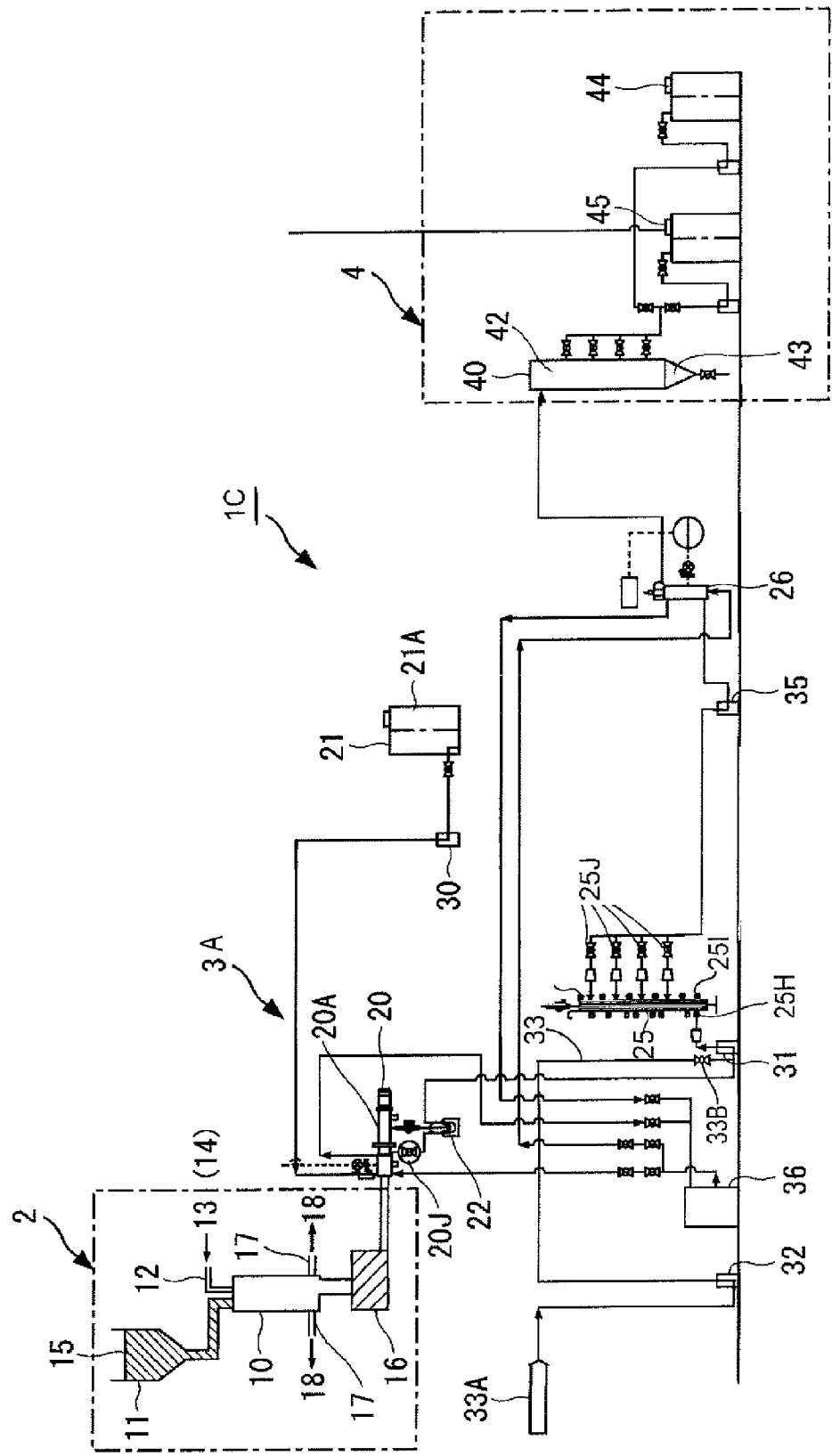
FIG. 11 is a block diagram illustrating the configuration of a Phase-Separation system plant for botanical resource according to the fourth embodiment of the present invention.

As shown in FIG. 11, a Phase-Separation system plant for botanical resource 1C according to the fourth embodiment is different from the conversion apparatus 1 according to the first embodiment shown in FIG. 1 only in that the Phase-Separation system plant for botanical resource 1C additionally includes the oscillating reactor 26. The oscillating reactor 26 is added for the purpose of improving the separation efficiency. The oscillating reactor 26 is the same as the oscillating reactor 26 shown in the Phase-Separation system plant for botanical resource 1A according to the second embodiment.

Fifth Embodiment

Figure 12:
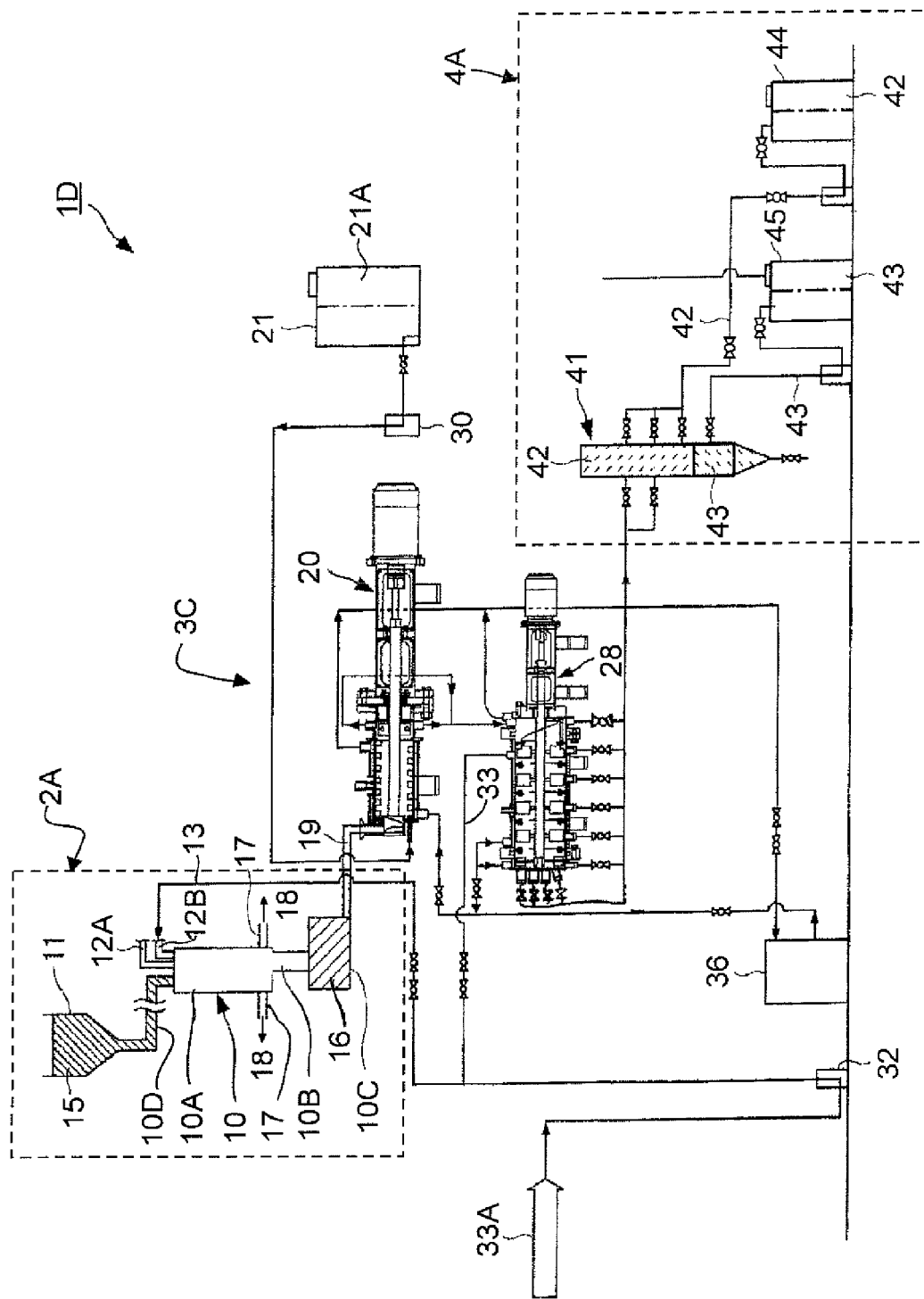
FIG. 12 is a block diagram illustrating the configuration of a Phase-Separation system plant for botanical resource according to the fifth embodiment of the present invention.

Entire Configuration of Outline of Phase-Separation System Plant for Botanical Resource As shown in FIG. 12, a Phase-Separation system plant for botanical resource 1D according to the fifth embodiment is configured to include: a raw material pre-treatment unit 2A; a concentrated acid treatment unit 3C; and the collecting unit 4. The raw material pre-treatment unit 2A is configured to include the agitation drying tank 10 and the raw material supply feeder 11. The concentrated acid treatment unit 3C is configured to include the reaction section 20 and an agitation extraction section 28. The collecting unit 4 is configured to include a liquid-liquid separation extractor 41, the phenol solution collection tank 44, and the concentrated acid solution collection tank 45.

[Treatment Principle]

The Phase-Separation system plant for botanical resource 1D subjects a botanical resource to a phase separation system conversion treatment based on the following first step to fifth step.

First step (raw material pre-treatment step): In the agitation drying tank 10, solvent (e.g., acetone) is added to a botanical resource-derived raw material (meals) to agitate the mixture to obtain a defatted raw material. Then, phenols 13 (e.g., cresol) are added to the defatted raw material to agitate the mixture to thereby obtain the phenol sorped raw material 16.

Second step (concentrated acid treatment step): In the reaction section 20, the concentrated acid 21A (e.g., concentrated sulfate) supplied from the concentrated acid supply section 21 is added to the phenol sorped raw material 16 and the resultant mixture is agitated and mixed to cause cellulose included in the phenol sorped raw material 16 to be swollen to thereby convert lignin included in the phenol sorped raw material 16 to lignophenol. Then, a treatment for subjecting a part of the cellulose to hydrolysis is carried out and the resultant liquid is sent as the treated liquid. In this step, in order to prevent a situation where swollen cellulose having a high viscosity is attached to the inner circumference face of the kneading machine body that block the rotation of the rotation blade, the blade tip end is provided in the vicinity of the inner circumference face of the kneading machine body so as to separate cellulose attached to the inner circumference face of the kneading machine body by a high-speed rotation of the rotation blade, thereby causing cellulose to be swollen within a short time.

Third step (phenol treatment step): In the agitation extraction section 28, the treated liquid sent from the reaction section 20 is introduced and agitated to promote the hydrolysis of cellulose and the conversion of lignin to lignophenol. Thereafter, phenols for extraction 33 (e.g., cresol) are added to the treated liquid and the resultant mixture is continuously agitated to extract lignophenol by the phenols for extraction, thereby sending the mixed solution of concentrated acid solution including a cellulose hydrolysate and phenol solution including a lignophenol derivative. In this step, the agitation extraction section 28 includes therein a dams composed of flashboards. A retention time can be provided prior to the input of the phenols for extraction 33 to the agitation extraction section (the agitation time for the decomposition of cellulose). A retention time after the input (the agitation time for the extraction of a lignophenol derivative) can be also provided. Thus, even various different botanical resources can be treated because of the appropriate treatment time. Thus, lignophenol derivatives can be collected with maintaining the desire molecular function and the industrial applicability.

Fourth step (liquid-liquid separation step): The liquid-liquid separation extractor 40A subjects the mixed solution sent from the agitation extraction section 28 to a liquid-liquid separation to separate the mixed solution into a phenol solution including a lignophenol derivative and a concentrated acid solution including a cellulose hydrolysate.

Fifth step (solution collection step): The phenol solution including a lignophenol derivative is taken out from the liquid-liquid separation extractor 40A and is collected in the phenol solution collection tank 44. Concentrated acid solution including a cellulose hydrolysate is taken out and is collected in the concentrated acid solution collection tank 45. This will be described in detail below.

[Configuration of Agitation Drying Tank 10]

As shown in FIG. 1, the agitation drying tank 10 is configured to include: a tank body 10a for agitating and drying a raw material; the stock section 10C connected to the bottom section of the tank body 10a via the delivery duct 10B; an agitation blade (not shown) provided in the tank body 10a; and a driving source (not shown) for driving the agitation blade.

The agitation drying tank 10 has, at the upper side of the tank body 10a, a raw material supply opening 10D, a solvent supply opening 12A, and a phenols supply opening 12B and also has, at the lower side of the tank body 10a, a chemical solution collection opening 17. The agitation drying tank 10 also has the delivery path 19 at the stock section 10C.

The raw material supply opening 10D is connected to the raw material supply feeder 11. The raw material supply feeder 11 stores therein botanical resource-derived meals A, as a raw material. The botanical resource-derived meals A are obtained from lignocelluloses composite material (e.g., wood, grass and flowers, straws, bamboo, or the pulp thereof) by drying in advance to turn the material into fine meals. A screw rotation-type meal supply feeder is used to supply the botanical resource-derived meals A in a fixed supply amount. The wood meals have preferably a size equal to or smaller than 20 to 60 mesh in order to increase the reaction efficiency.

The solvent supply opening 12A is connected to a solvent supply apparatus (not shown). The solvent supply apparatus stores therein solvent such as acetone or alcohol and supplies the solvent so that the solvent is supplied in an amount having a fixed ratio to the amount of the raw material supplied from the raw material supply feeder 11.

The phenols supply opening 12B is connected, for example, to a phenols supply apparatus 6 for storing phenols such as m-cresol or p-cresol. The phenols supply apparatus 6 stores therein phenols and supplies, after the completion of the defatting treatment, phenols so that phenols are supplied in an amount having a fixed ratio to the amount of the raw material supplied from the raw material supply feeder 11.

Phenols used for sorption and phenols used for extraction may be different.

Phenols supplied at this stage are used for the purpose of phenol sorption. Phenol sorption is provided in order to suppress, by solvating lignin with phenol, the frequency at which lignin has a contact with acid and to allow, when lignin has a contact with acid, phenol to be grafted to a benzyl position at which lignin is most reaction-active for stabilization and to improve the phenol activity.

Phenols is supplied in an amount that is required to synthesize lignin included in wood meals into a lignophenol derivative and is used together with solvent.

When phenol is used in the minimum amount and defatted wood meals are directly solvated with phenol, the small liquid amount causes unevenness. To prevent this, phenol is dissolved in acetone in an amount for allowing wood meals to be sufficiently solvated. Then, the resultant solution is added to defatted wood meals and the mixture is agitated to subsequently distill acetone away. This can consequently minimize the amount of phenol used and can allow the wood meals to be evenly solvated with phenol.

A lignophenol derivative is a compound having a 1,1-bis (aryl)propane-2-O-arylether structure in which a phenol derivative is bonded to C1 (benzyl position) of a phenyl propane skeleton.

Phenols may be any of monovalent, bivalent, and trivalent phenols. With regard to the hydrophobicity of a lignophenol derivative synthesized by lignin included in wood meals and a phenol derivative, a lignomonophenol derivative (monovalent phenol) has the highest hydrophobicity. Monovalent phenol includes, for example, phenol, alkylphenol such as cresol, methoxyphenol, and naphthol. Thus, a hydrophobic compact is preferably synthesized using monovalent phenol of cresol.

Another configuration also may be used where any of the solvent supply opening 12A and the phenols supply opening 12B is provided and a not-shown solvent supply apparatus and a not-shown phenols supply apparatus are connected thereto so that these apparatuses can be shared.

The chemical solution collection opening 17 is connected to a not-shown solvent collection tank. This solvent collection tank collects, through the chemical solution collection opening 17, solvent that includes the fat transferred from the raw material when solvent for the defatting treatment of the raw material supplied to the tank body 10a is agitated together with the raw material. The collected solvent is subjected to the separation of fat and is purified prior to being subjected to reuse. This can consequently reduce the amount of solvent used.

According to the configuration as described above, in the raw material pre-treatment step, the dried botanical resource-derived meal raw meal material and solvent, which are continuously supplied to the tank body 10a at a fixed ratio, are agitated to defat and generating a defatted raw material in the agitation drying tank 10.

Then, the defatted raw material and phenols supplied at a fixed ratio thereto are agitated to obtain the resultant phenol sorped raw material to a pre-treatment to store the phenol sorped raw material in the stock section 10C.

The term "phenol sorped raw material" means a raw material in which a lignocellulose composite solvated with phenol. In the case, phenol is cresol, hereinafter referred as to "cresol sorption wood meals".

[Configuration of Reaction Section 20]

Figure 13:
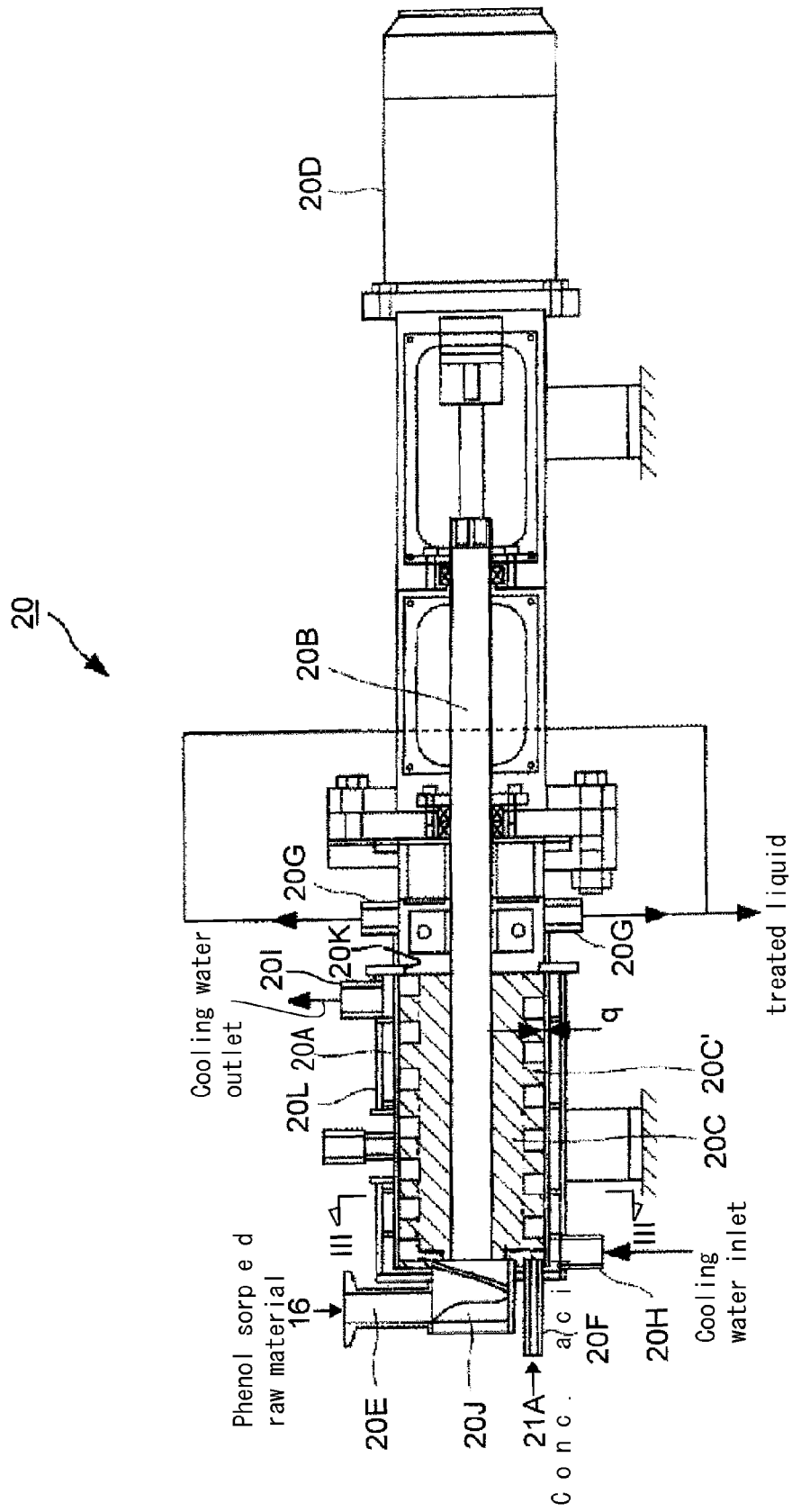
FIG. 13 is a cross-sectional view illustrating the configuration of the reaction section of the conversion apparatus of FIG. 12.

As shown in FIG. 13, the reaction section 20 is configured to include: the reactor body 20A; the motor 20D; the rotation axis 20B; the pressure feeding blade 20J; the agitation blade 20C; the phenol sorped raw material inlet 20E; the treated liquid outlet 20G; and the concentrated acid inlet 20F.

The reactor body 20A has a cylindrical shape whose core is provided in a horizontal direction. One end in the cylinder core direction has the phenol sorped raw material inlet 20E. The other end in the cylinder core direction has the treated liquid outlet 20G. The rotation axis 20B passes through the center of the reactor body 20A and is rotated by the motor 20D.

The pressure feeding blade 20J is positioned at the upstream-side than the agitation blade 20C and is fixed to a position of the rotation axis 20B that corresponds to the inlet 20E. The pressure feeding blade 20J functions to pressure-feed, when is rotated by the motor 20D, the phenol sorped raw material 16 and the concentrated acid 21A in the axial direction. On the other hand, a flashboard 20K, which is made of metal and has a circular ring-like shape and is positioned at the downstream-side than the agitation blade 20C, reduces the space in which the agitation blade 20C can be turned and which allows the treated liquid to pass. This causes a flow resistance to the treated liquid to retain the treated liquid in the space in which the agitation blade 20C can be turned, thus slightly suppressing a short path (which means an immediate passing).

Figure 3:
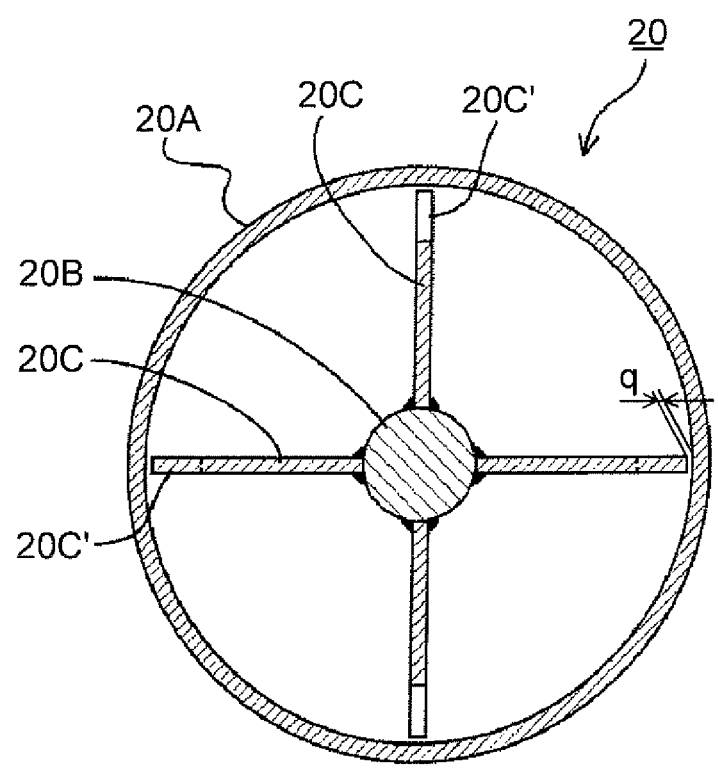
FIG. 3 is a cross-sectional view taken along III-III in FIG. 2 and FIG. 13.

As shown in FIG. 3, four agitation blades 20C are provided to surround the rotation axis 20B extending through the center of the reactor body 20A so that these four agitation blades 20C are welded and fixed equally (that is, four agitation blades are provided at different positions at an angle of 90 degrees). The agitation blades 20C extend radially from the rotation axis 20B. The blade tip end 20C' has a comb-like shape. Also, the blade tip end 20C' is provided in the vicinity of the inner circumference face of the reactor body 20A. The blade tip end 20C' of one agitation blade and the blade tip end 20C' of another agitation blade arranged in a zigzag alignment are rotated at a high speed to function to agitate the phenol sorped raw material and concentrated acid. The inlet 20F of the concentrated acid 21A is provided in the reactor body 20A to be adjacent to the pressure feeding blade 20J.

The reason why the clearance q between the blade tip end 20C' of the agitation blade 20C and the inner circumference face of the reactor body 20A is reduced to 1 mm for example is that a highly viscous and massive phenol sorped raw material at an initial stage of the agitation is rolled and fragmented by the blade tip end of the agitation blade 20C and the inner face of the reactor body 20A for fragmentation. More specifically, concentrated acid (which is preferably sulfate specifically) is added to the phenol sorped raw material and the resultant mixture is agitated and mixed to thereby cause cellulose to be swollen, thus causing a higher viscosity. If the highly-viscous cellulose is attached to the inner circumference face of the reactor body 20A and grows to have a large film thickness, this significantly disturbs the rotation of the agitation blade 20C. Thus, the small clearance q as described above can suppress the cellulose film on the inner circumference face of the reactor body 20A from having an increased thickness to secure the high-speed rotation of the agitation blade 20C, thus providing high agitation force and kneading force to cause cellulose to be effectively swollen through an agitation for a short time.

The reaction section 20 receives the phenol sorped raw material 16 to subject the phenol sorped raw material 16 and the concentrated acid 21A to agitation and mixing to thereby cause cellulose included in the phenol sorped raw material 16 to be swollen to convert lignin included in the phenol sorped raw material 16 to lignophenol. Furthermore, in the reaction section 20, a part of the cellulose is hydrolyzed and then the resultant liquid is send as the treated liquid. The conversion of lignin to lignophenol means a reaction by which phenols cause a side chain benzyl position of lignin included in the phenol sorped raw material 16 to be phenolated to result in a lignophenol derivative.

The reaction section 20 is configured so that the pressure feeding blade 20J has a role to play the feeding of the phenol sorped raw material 16 in the axial direction and the agitation blade 20C has a role to play the agitation and mixing of the phenol sorped raw material 16 and the concentrated acid 21A. Since the agitation and mixing need to be carried out with a reaction temperature retained within a range from 20 degrees C. to 40 degrees C., a temperature control means is provided. The temperature control means is composed of a water jacket 20L provided to surround the reactor body 20A; the cooling water inlet 20H and the cooling water outlet 20I provided in the water jacket 20L; and the chiller unit 36 shown in FIG. 1. The cooling water fed from the chiller unit 36 passes through the cooling water inlet 20H to circulate in the water jacket 20L to pass through the cooling water outlet 20I to return to the chiller unit 36 (see FIG. 12). During summer, the temperature control means provides cooling because reaction heat causes a temperature higher than a temperature from 20 degrees C. to 40 degrees C. During a cold period on the other hand, such a temperature is caused that is lower than the temperature from 20 degrees C. to 40 degrees C. Thus, the temperature control means causes warm water to flow instead of cooling water so that the reaction temperature is within a range from 20 degrees C. to 40 degrees C. The reason why the reaction temperature is within the range from 20 degrees C. to 40 degrees C. is that the temperature during hydrolysis equal to or higher than 40 degrees C. causes a high affinity between phenol and concentrated acid to excessively promote the reaction and thus is not preferred. A temperature during hydrolysis lower than 20 degrees C. on the other hand causes declined reaction efficiency and causes an increased viscosity or solidification of the treated liquid of phenol sorped raw material and concentrated sulfate to jam a solution sending pipe and thus is not preferred.

[Configuration of Agitation Extraction Section 28]

Figure 14:
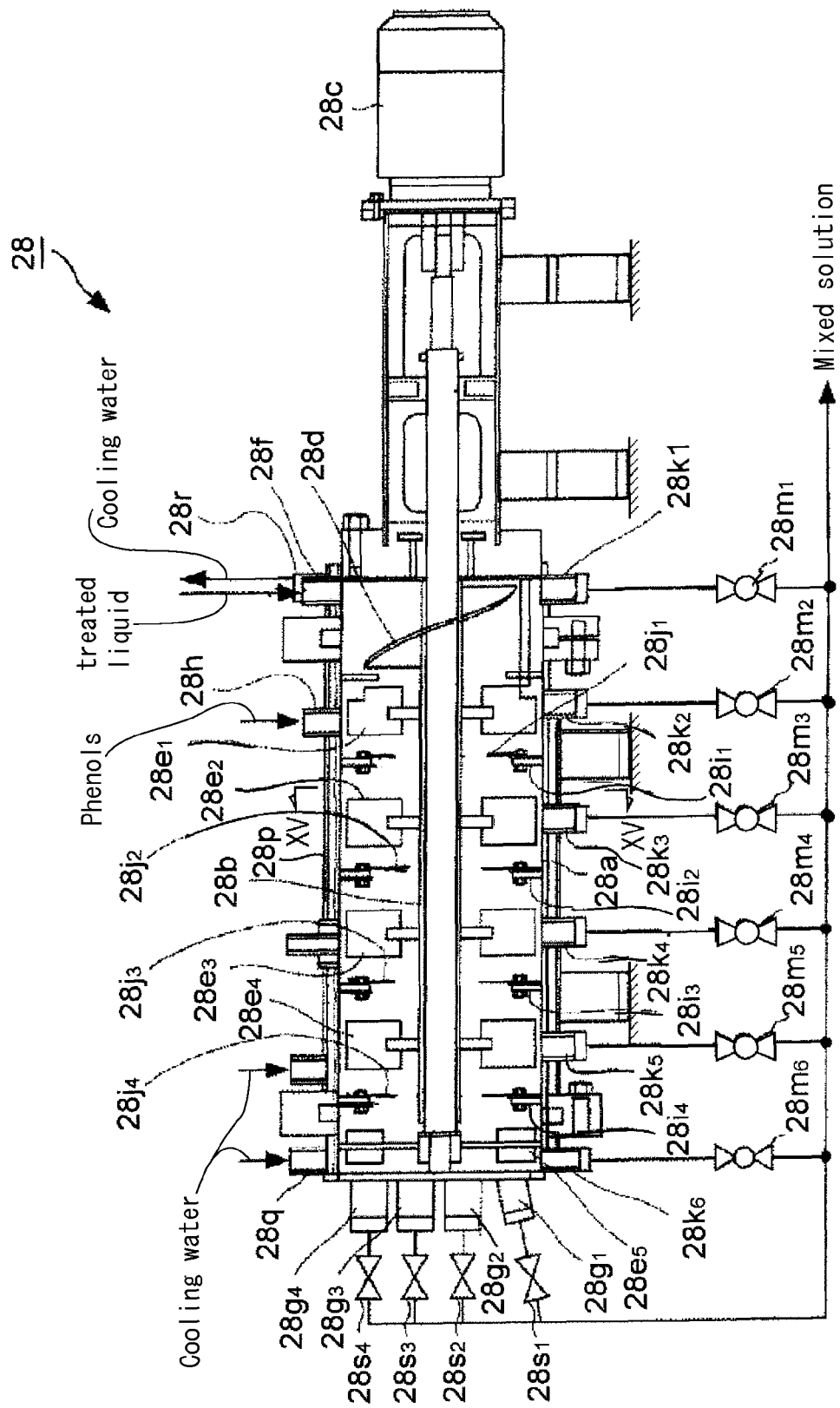
FIG. 14 is a cross-sectional view illustrating the agitation extraction section of the conversion apparatus of FIG. 12.
Figure 1:
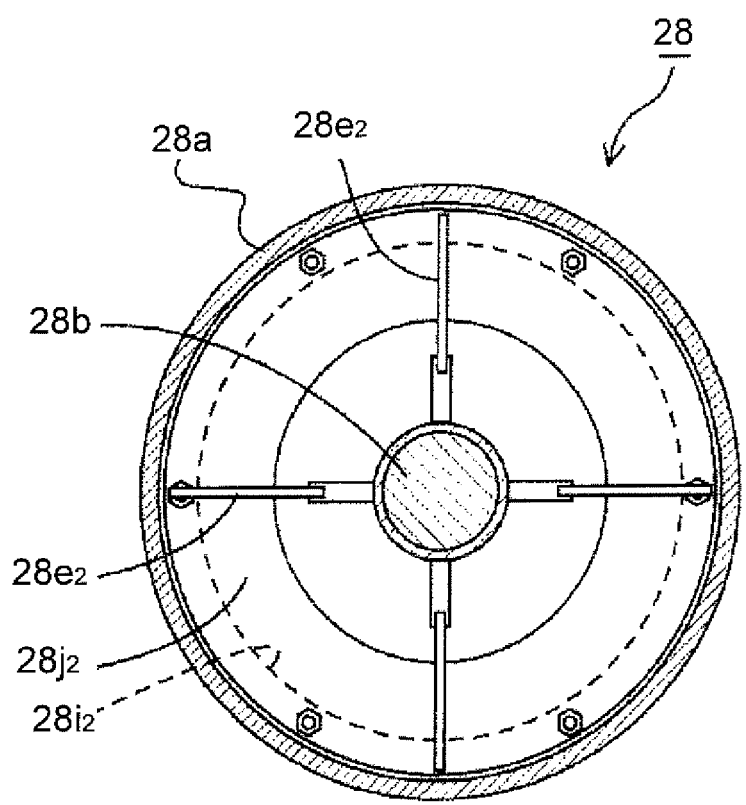

As shown in FIG. 14, the agitation extraction section 28 includes: a cylindrical extraction container 28a; a motor 28c; a rotation axis 28b; a pressure feeding blade 28d; a plurality of agitation blades $28e_1$ to $28e_5$; a treated liquid inlet 28f and a plurality of liquid outlets $28g_1$ to $28g_4$; a plurality of liquid collection openings $28k_1$ to $28k_6$; a chemical solution inlet 28h; and a plurality of flashboards $28j_1$ to $28j_4$ constituting a dam.

The cylindrical extraction container 28a has a cylindrical shape whose core is provided in a substantially-horizontal direction. The rotation axis 28b passes through the center of the cylindrical extraction container 28a and is rotated by the motor 28c. The pressure feeding blade 28d fixed to the liquid inlet-side end of the rotation axis 28b is rotated to pressure-feed, in the axial direction, the treated liquid treated by the reaction section 20. The plurality of agitation blades $28e_1$ to $28e_5$ are provided on the rotation axis 28b and are positioned in the respective spaces obtained by dividing the space in the cylindrical extraction container 28a to a plurality of spaces in the cross-sectional direction. The agitation blades $28e_1$ to $28e_5$ extend in a radial fashion and have blade planes parallel to the axis line and function to pressure-feed the treated liquid to the circumference direction of the cylindrical extraction container 28a to agitate the liquid. Viscosity of cellulose is increased when being swollen, however, the viscosity decreased when the cellulose is hydrolyzed to be change the carbohydrates. Thus, the agitation blade 28e does not need to have a reduced clearance between the blade tip end and the inner circumference face of the cylindrical part.

The liquid inlet 28f is a path for introducing the treated liquid treated by the reaction section 20. The liquid outlets $28g_1$ to $28g_4$ are provided to have different heights. The liquid outlets $28g_1$ to $28g_4$ have sluice valves $28s_1$ to $28s_4$. When any of the liquid outlets is selected and the corresponding sluice valve is opened, the liquid level at which the treated liquid is retained can be set and the time during which the treated liquid passes therethrough can be adjusted.

The agitation extraction section 28 is configured so that the treated liquid treated by the reaction section 20 is continuously introduced through the liquid inlet 28f into the cylindrical extraction container 28a at a low flow rate. Then, the treated liquid is fed by the pressure feeding blade 28d and is agitated by the agitation blades $28e_1$ to $28e_5$. Then, phenols for extraction are added thereto and the resultant mixture is agitated to provide mixed solution that is subsequently sent through any of the liquid outlets $28g_1$ to $28g_4$.

The liquid collection openings $28k_1$ to $28k_6$ have the sluice valves $28m_1$ to $28m_6$. The mixing liquid remaining among the flashboards $28j_1$ to $28j_4$ in the cylindrical extraction container 28a to flow down for collection at the end of the treatment when all of the sluice valves are opened at the end of the treatment in the agitation extraction section 28. The liquid collection openings $28k_2$ to $28k_6$ may be used as an outlet of the mixing liquid by opening the sluice valves $28m_2$ to $28m_6$, when the raw material is such as grass plant.

The chemical solution inlet 28h is provided at a position away from the liquid inlet 28f by a required distance and is used to input phenols for extraction fed from the phenols supply apparatus 6. The purpose of inputting phenols for extraction is as follows. The retention and agitation are performed at the upstream-side in the agitation extraction section 28 to promote the hydrolysis of cellulose to thereby promote the reaction of turning lignin into phenol, resulting in lignophenol derivatives. While the lignophenol derivatives are being dispersed in the concentrated acid solution, phenols for extraction are inputted thereto to transfer the lignophenol derivatives from the concentrated acid solution to phenols for extraction.

Another configuration also may be used in which, in order to delay the timing at which phenols for extraction are inputted, the liquid collection openings $28k_2$ to $28k_5$ are connected in parallel to filling pipes via sluice valves so that phenols for extraction fed from the phenols supply apparatus 6 can be inputted through any of the liquid collection openings $28k_3$ to $28k_5$ (not shown).

The agitation extraction section 28 includes, as in the case of the reaction section 20, a temperature control means that is composed of a water jacket 28p surrounding the cylindrical extraction container 28a, a temperature control water inlet 28q and a temperature control water outlet 28r provided in the water jacket 28p, and the chiller unit 36 (for shared use) shown in FIG. 1. Thus, the reaction temperature in the cylindrical extraction container 28a is controlled so as to keep a temperature in a range from 20 degrees C. to 40 degrees C.

As shown in FIG. 15, the flashboards $28j_1$ to $28j_4$ are composed of a Teflon® plate having a doughnut-like shape. The flashboards $28j_1$ to $28j_4$ are fixed to flanges $28i_1$ to $28i_4$ provided at the inner circumference of the cylindrical extraction container 28a by a fastening tool (bolt, nut). The flashboards $28j_1$ to $28j_4$ form a plurality of dams, arranged in the kneading machine body in the cylindrical direction, for storing the treated liquid. Since the flashboards $28j_1$ to $28j_4$ have a doughnut-like shape, a smaller hole at the center increase the amount of liquid stores among the dams and a larger hole at the center on the other hand reduce the amount of liquid stored among the dams, thus controlling the retention time. Specifically, the flashboards $28j_1$ to $28j_4$ function as a plurality of dams to retain the treated liquid in the cylindrical extraction container 28a. Since the treated liquid is fed by the pressure feeding blade 28d, the treated liquid is allowed to flow down the flashboards $28j_1$ to $28j_4$ sequentially toward the downstream dams without being filled in the cylindrical extraction container 28a.

The agitation blades $28e_1$ to $28e_6$ agitate the treated liquid held back by the respective doughnut-like-shaped flashboards $28j_1$ to $28j_4$. The agitation blades $28e_1$ to $28e_6$ have an agitation function and do not have a function to feed the treated liquid to the dams at the downstream. The treated liquid stored in the respective dams are agitated by the respective corresponding agitation blades while passing through the center holes of the flashboards at the upstream to thereby flow into the dams at the downstream. In order to increase the retention time at the respective dams, the doughnut-like-shaped flashboards $28j_1$ to $28j_4$ can be allowed to have a smaller hole at the center thereof. In order to reduce the retention time at the respective dams, the doughnut-like-shaped flashboards $28j_1$ to $28j_4$ may have an increased hole at the center thereof, thus controlling the retention time.

In FIG. 14, phenols for extraction are inputted through the chemical solution inlet 28h at the upper side. However, phenols for extraction also may be inputted through the liquid collection openings $28k_1$ to $28k_4$ at the lower side of the cylindrical extraction container 28a. Thus, by the existence of the flashboards $28j_1$ to $28j_4$, both the agitation time prior to the kneading of the chemical solution added with treated liquid and the agitation time required for the chemical solution added with the treated liquid to be kneaded to result in mixed solution are controlled. Accordingly, the hydrolysis of cellulose and the conversion of lignin to lignophenol proceed without adding phenols for extraction for an appropriate period of time and then phenols for extraction are added for a treatment to extract lignophenol in phenols for extraction for an appropriate period of time.

Thus, the agitation extraction section 28 is configured so that the treated liquid sent from the reaction section 20 is introduced from one end-side of the cylindrical extraction container 25A and an appropriate one is selected from among the plurality of inlets ($28h$, $28k_1$ to $28k_4$) through which phenols for extraction are inputted. The treated liquid in the container is held back at a plurality of stages and is agitated at the respective holding positions. An appropriate one is selected from among the plurality of liquid outlets ($28g_1$ to $28g_4$) through which the mixed solution of phenol solution including a lignophenol derivative and concentrated acid solution including a cellulose hydrolysate is sent.

[Configuration of Collecting Unit]

As shown in FIG. 12, the collecting unit 4A is configured to include: the liquid-liquid separation extractor 41; the concentrated acid solution collection tank 45; and the phenol solution collection tank 44.

Figure 16:
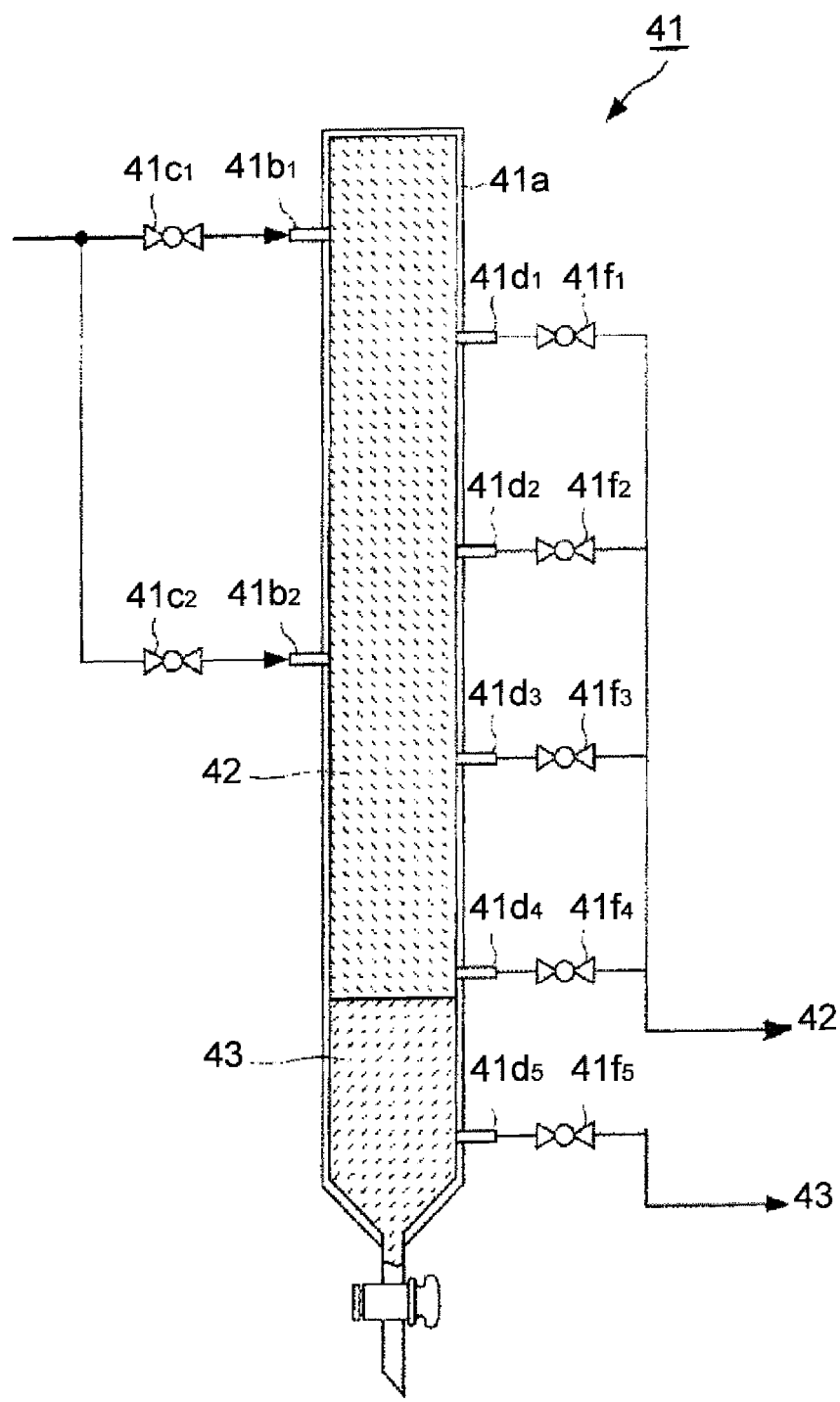
FIG. 16 is a schematic partial cross-sectional view illustrating the configuration of the liquid-liquid separation extractor of the conversion apparatus of FIG. 12.

As shown in FIG. 16, the liquid-liquid separation extractor 41 is composed of: the tube container 41a having a sealed structure made of grass or resin for example formed to have a sealed cylindrical shape in which the core is arranged in a substantially vertical direction; supply openings $41b_1$ and $41b_2$ that are provided at the uppermost part and the middle part of the tube container 41a and that are used to supply therethrough the mixed solution including lignophenol derivative, phenol, a cellulose hydrolysate, and concentrated acid sent from the agitation extraction section 28; supply-side changeover valves $41c_1$ and $41c_2$ provided in a supply pipe; a plurality of light liquid outlets $41d_1$ to $41d_4$ provided at the middle of the tube container 41a; a heavy liquid outlet 41e provided at the lower side of the tube container 41a; and output-side changeover valves $41f_1$ to $41f_5$ provided at an output pipe of light liquid outlet $41d_1$ to $41d_4$ and heavy liquid outlet $41d_5$ for example. The supply of the mixed solution to the tube container 41a is not limited to the supply openings $41b_1$ and $41b_2$ for the lateral supply to the tube container 41a. The mixed solution also may be directly supplied from just above the tube container 41a to the liquid level. In this case, the mixed solution is preferably allowed to flow down the inner face of the tube container 41a.

In the liquid-liquid separation extractor 41, the mixed solution including lignophenol derivatives, phenol, a cellulose hydrolysate, and concentrated acid sent from the agitation extraction section 28 flows from the supply opening $41b_1$ or $41b_2$ and is stored. Then, the concentrated acid solution including monosaccharide such as glucose, oligosaccharide, and polymer for example as a cellulose hydrolysate settles down because the concentrated acid solution is heavy liquid. Thus, a liquid-liquid separation results in phenol solution of light liquid including lignophenol derivatives remaining at the upper side.

The phenol solution 42 in the liquid-liquid separation extractor 41 is immediately extracted through any of the light liquid outlets $41d_1$ to $41d_4$ by opening any of the output-side changeover valves $41f_1$ to $41f_4$ and is subsequently stored in the phenol solution collection tank 44. The concentrated acid solution 43 separated at the lower layer in the liquid-liquid separation extractor 40A is collected through the heavy liquid outlet $41d_5$ into the concentrated acid solution collection tank 45 by opening the output-side changeover valve $41f_5$. The concentrated acid solution collected in the concentrated acid solution collection tank 45 can be converted, although not shown, to sugar for example useful as an industrial raw material by further continuing a diluted solution treatment. In the case, the mixed solution is supplied through the supply opening $41b_1$, the liquid-liquid separation in the liquid-liquid separation extractor 41 is a batch processing by which phenol solution can be extracted through the light liquid outlets $41d_1$ to $41d_4$ approximately on the basis of the molecular weight. In the case, the mixed solution is supplied through the supply opening $41b_2$, phenol solution is continuously extracted through the light liquid outlet $41d_1$.

According to this embodiment, in the reaction section 20, by the agitation blade 20C that is rotated at a high speed in the circular space along the inner circumference face of the reactor body 20A, the phenol sorped raw material 16 and the concentrated acid 21A are agitated and mixed. The agitation blade 20C causes, by agitation, cellulose included in the phenol sorped raw material to have a contact with concentrated acid. Cellulose is caused to be swollen by the contact with concentrated acid. Since the clearance q between the agitation blade 20C and the inner circumference face of the reactor body 20A is small, swollen cellulose having a high viscosity is prevented from being attached to the inner circumference face of the kneading machine body to grow to have an increased thickness. Thus, a high-speed rotation can be maintained. Thus, cellulose is swollen for a short time. The agitation blade 20C causes the swollen cellulose to be kneaded with high agitation and kneading forces to hydrolyze the swollen cellulose partially, thereby decreasing the viscosity. At the same time, the conversion of lignin to lignophenol is carried out immediately.

In the agitation extraction section 28, the treated liquid treated by the reaction section 20 is introduced into the cylindrical extraction container 28a. The agitation extraction section 28 enough secures the agitation time until the phenols for extraction are inputted and the agitation time after the input even though the apparatus is compact. In the agitation extraction section 28, since an agitation as an extension of a treatment by the reaction section 20 is performed at upstream site, the hydrolysis of cellulose and the conversion of lignin to lignophenol are proceeded enough for a required reaction time.

At the downstream site, agitation is continued and the phenols for extraction 33 are added to extract lignophenol in phenols for extraction. Thus mixed solution including lignophenol derivatives, a cellulose hydrolysate, concentrated acid, and phenols is sent.

According to the Phase-Separation system plant for botanical resources 1 and 1A to 1D of the embodiments, a botanical resource as a lignocellulosic composite material is efficiently separated into phenol solution including a lignophenol derivative and concentrated acid solution including monosaccharide such as glucose, oligosaccharide, and polymer for example as a cellulose hydrolysate so that the respective constituents can maintain the molecular functions. In particular, even when various different botanical resources are used, lignophenol derivatives are collected so that the molecular function can be maintained and the industrial use can be achieved.

Also according to the Phase-Separation system plant for botanical resources of the embodiments, lignin derivatives such as lignophenol that can be reused are continuously and efficiently extracted from the raw material of a botanical resource such as wood (in particular softwood), grass and flowers, and straws at an ordinary temperature causing less energy consumption to thereby separate sugar for example. Carbohydrates also can be collected.

Also according to the Phase-Separation system plant for botanical resources of the embodiments, a continuous treatment for an efficient reaction is provided. Thus, such Phase-Separation system plant for botanical resource and method are provided by which lignin derivatives and carbohydrate are obtained in an industrial manner.

Sixth Embodiment

Configuration of Collecting Unit

The following section describes the collecting unit of a Phase-Separation system plant for botanical resource according to the sixth embodiment.

Figure 17:
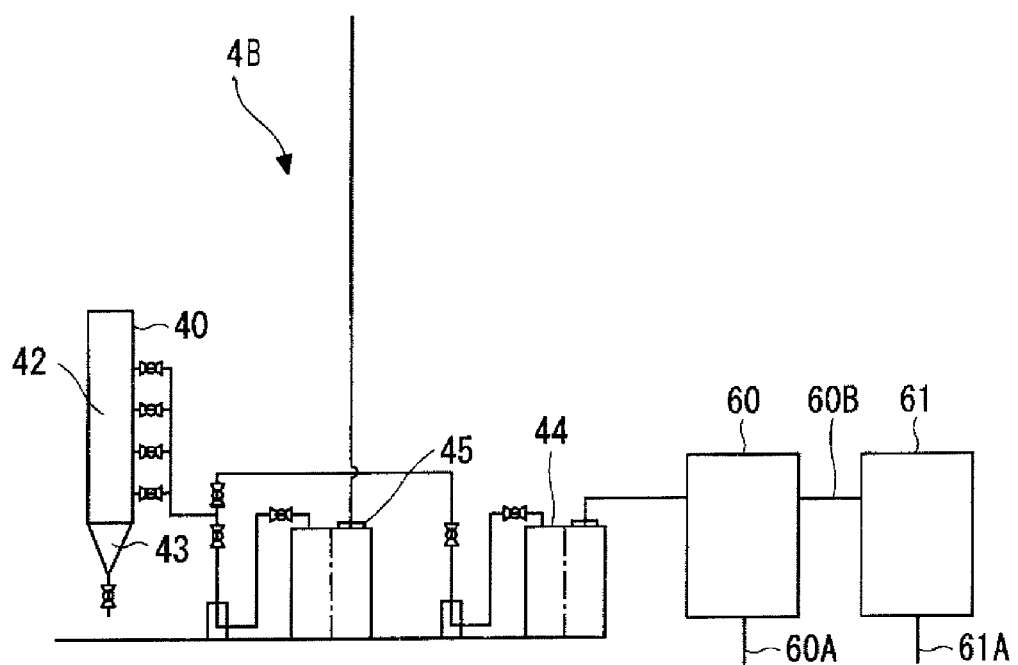
FIG. 17 is a block diagram illustrating the configuration of a collecting unit of a Phase-Separation system plant for botanical resource according to the sixth embodiment of the present invention.

A collecting unit 4B shown in FIG. 17 has a configuration that includes, in addition to the collecting unit 4 shown in FIG. 1, an alkali treatment unit 60 for treating the lignin layer 42 with an alkali and a poor solvent tank 61 for extracting lignophenol from the affinity layer collected by the alkali treatment unit 60.

In the alkali treatment unit 60, the lignin layer 42 extracted from the liquid-liquid separation extractor 40 is contacted with an alkali metal compound to separate an insoluble fraction 60A and an affinity layer 60B. The insoluble fraction 60A is produced by the reaction between the concentrated acid 21A, such as sulfate, included in the lignin layer and an alkali metal compound. The insoluble fraction 60A also includes a little alkali salt of cresol produced by the reaction between the lignin layer 42 and an alkali metal compound. The affinity layer 60B is a lignin layer. An alkali metal compound is preferably weakly basic compound such as carbonate of sodium for example.

The poor solvent tank 61 stores therein a poor solvent to lignophenol. The lignophenol in the affinity layer 60B fractionated by the alkali treatment unit 60 is collected by a poor solvent as a deposit 61A. The deposit 61A is lignophenol. A poor solvent is, for example, diisopropylether, diethyl ether, or n-hexane.

In the collecting unit 4B, the concentrated acid layer 43 is carried away from the lignin layer 42 effectively in the alkali treatment unit 60 by alkali treating the concentrated acid layer included in the lignin layer. Accordingly, efficiency of significantly improving for collecting lignophenol is obtained. This can consequently reduce the used amount of poor solvent such as diisopropylether.

EXAMPLE 1

The following is an example of extraction of lignophenol from hinoki cypress meals using the Phase-Separation system plant for botanical resource 1A.

5 kg Hinoki cypress meals of were put into the agitation drying tank 10 and the solvent 14 of acetone of 50 liter was inputted thereto and the resultant mixture was agitated for one hour while being heated. Then, acetone was removed and was added again and the resultant mixture was agitated. The above process was performed three times, thereby obtaining defatted wood meals. The defatted wood meals were added with acetone in which the sorption phenols 13 of p-cresol of 2.5 kg were dissolved. Then, the resultant mixture was agitated for one hour. Then, acetone was distilled away by heating and pressure reduction, thereby obtaining the phenol sorped raw material 16.

72% concentrated acid 21A was supplied at a flow rate of 40 cm$^3$/minute and the phenol sorped raw material 16 was supplied at a flow rate of 12 g/minute to the reaction section 20.

Then, the treated liquid eluted from the reaction section 20 was introduced to the first agitation buffer bath 22 and was sent to the lower part of the first agitation extraction section 23 while being agitated. The treated liquid was collected through the uppermost part of the first agitation extraction section 23 and was sent to the second agitation buffer bath 24. At the same time, m,p-phenols 33 for lignophenol extraction was supplied thereto at a flow rate of 20 cm$^3$/minute.

Then, the treated liquid was agitated in the second agitation buffer bath 24 and was subsequently inputted to the lower part of the second agitation extraction section 25. Then, the treated liquid was collected through the uppermost part and was sent to the oscillating reactor 26. The treated liquid treated by the ultrasonic treatment by the oscillating reactor 26 was sent via the third agitation buffer bath 27 to the liquid-liquid separation extractor 40.

Finally, in the liquid-liquid separation extractor 40, the lignin layer 42 including lignophenol was separated from the sulfate layer 43 containing carbohydrates.

By the steps as described above, the Phase-Separation system plant for botanical resource 1A is used to continuously extract lignophenol from the hinoki cypress meals 16.

The present invention is not limited to the above example and can modify within the scope of the inventions of claims. Such modifications are also within the scope of the present invention. For example, another configuration in which the first agitation extraction section 23, the second agitation extraction section 25, and the liquid-liquid separation extractor 40 in the configuration shown in FIG. 10 are provided in plurality of stages, respectively is also included in the scope of the present invention.

DESCRIPTION OF REFERENCE NUMERALS 1, 1A, 1B, 1C, 1D: Phase-Separation system plant for botanical resource
2: Raw material pre-treatment unit
3, 3A, 3B: 3C Concentrated acid treatment unit
4, 4A, 4B: Collecting unit
10: Agitation drying tank
10A: Tank body
10B: Delivery duct
10C: Stock section
11: Raw material supply feeder
12: Chemical agent supply section
13: Sorption phenols
14: Solvent
15: Raw material
16: Phenol sorped raw material
17: Chemical agent collecting section
18: Collected chemical agent (already-used solvent and sorption phenols)
20: Reaction section
20A: Reaction section body
20B: Rotation axis
20C: Agitation blade
20D: Motor
20E: Inlet
20F: Inlet
20G: Outlet
20H: Cooling water inlet
20I: Cooling water outlet
20J: Pressure feeding blade
21: Concentrated acid supply section
21A: Concentrated acid
22: Agitation buffer bath
22A: Inlet
22B: Outlet
22C: Liquid level sensor
22D: Temperature controller
23: First agitation extraction section
24: Second agitation buffer bath
25: Second agitation extraction section
25A: Mixing container
25B: Agitation mechanism
25C: Base
25D: Motor
25E: Rotation axis
25F: Rotation blade
25G: Partition plate
25H: Introduction opening
25I: Outlet
25J: On-off valve
26: Oscillating reactor
26A: Tube section
26B: Ultrasonic transducer
26C: Cooling piping
27: Third agitation buffer bath
28: Agitation extraction section
28$a$: Cylindrical extraction container
28$b$: Rotation axis
28$c$: Motor
28$d$: Pressure feeding blade
28$e$1 to 28$e$5: Agitation blade
28$f$: treated liquid inlet
28$g$1 to 28$g$4: treated liquid outlet
28$h$: Chemical solution inlet
28$j$1 to 28$j$4: Flashboard
28$k$1 to 28$k$6: Liquid collection opening
30: Solution sending pump
31: Solution sending pump
32: Solution sending pump
33: Phenols for extraction
33A: Tank
33B: On-off valve
33C: On-off valve
34: Solution sending pump
35: Solution sending pump
36: Chiller unit
40: Liquid-liquid separation extractor
42: Lignin layer
43: Sulfate layer
50: First bypass line
51: Second bypass line
52: Third bypass line
53: On-off valve
54: On-off valve
55: On-off valve
56: On-off valve
57: On-off valve
60: Alkali treatment section
60A: Insoluble fraction
60B: Affinity layer
61: Poor solvent tank
61A: Deposit

What is claimed is:

1. A concentrated acid treatment unit in which a phenol sorped raw material obtained by subjecting phenol to sorption by a botanical resource is reacted with concentrated acid and then phenol is added to the resultant treated liquid to extract a lignophenol derivative, comprising:

a reaction section for obtaining treated liquid by the reaction between the phenol sorped raw material and the concentrated acid; and an agitation extraction section for adding phenol to the treated liquid to thereby extract mixed solution including a lignophenol derivative, wherein the reaction section has a reactor body and agitation blades provided in the reactor body such that the highly viscous and massive treated liquid obtained by the reaction between the phenol sorped raw material and the concentrated acid is rolled by an inner circumference face of the reactor body and the agitation blades for fragmentation, wherein the agitation extraction section includes:

a cylindrical extraction container for which a shaft axis direction is an up-and-down direction;

a rotation axis provided in the cylindrical extraction container;

a plurality of circular plate-like flashboards that are arranged in a shaft axis direction of the rotation axis, the plurality of circular plate-like flashboards are configured so that an outer diameter is close to an inner face of the cylindrical container and have a small opening for communicating treated liquid;

extraction agitation blades provided among the flashboards to agitate treated liquid, a plurality of inlets that are provided at one side of the cylindrical extraction container and that are arranged in a longitudinal direction to correspond to the respective flashboards; and a plurality of liquid outlets that are provided at the other side of the cylindrical extraction container and that are arranged in a longitudinal direction to correspond to the respective flashboards, whereas treated liquid sent from the reaction section is introduced through an inlet appropriately selected from among the inlets into the cylindrical extraction container, phenol is introduced through a liquid outlet appropriately selected from among the liquid outlets into the cylindrical extraction container, and mixed solution of the treated liquid and phenol is sent through another liquid outlet appropriately selected from among the liquid outlets.

2. The concentrated acid treatment unit according to claim 1, wherein the agitation extraction section further has a pressure feeding blade that is provided at the rotation axis to correspond to the treated liquid introduction opening, the pressure feeding blade is rotated to agitate the treated liquid introduced through the treated liquid introduction opening while pressure-feeding the treated liquid toward the liquid outlet.

3. A concentrated acid treatment unit in which a phenol sorped raw material obtained by subjecting phenol to sorption by a botanical resource is reacted with concentrated acid and then phenol is added to the resultant treated liquid to extract a lignophenol derivative, comprising:

a reaction section for obtaining treated liquid by the reaction between the phenol sorped raw material and the concentrated acid; and an agitation extraction section for adding phenol to the treated liquid to thereby extract mixed solution including a lignophenol derivative, wherein the reaction section has a reactor body and agitation blades provided in the reactor body such that the highly viscous and massive treated liquid obtained by the reaction between the phenol sorped raw material and the concentrated acid is rolled by an inner circumference face of the reactor body and the agitation blades for fragmentation, wherein the agitation extraction section has:

a cylindrical extraction container for which a shaft axis direction is a horizontal direction;

a rotation axis provided in the cylindrical extraction container;

a plurality of flashboards having circular ring shape arranged in the cylindrical extraction container in a shaft axis direction;

extraction agitation blades that are provided among the respective flashboards and that are provided at the rotation axis;

a treated liquid introduction opening provided at one end of the cylindrical extraction container;

a plurality of extraction phenol inlets provided at the middle of the cylindrical extraction container; and a liquid outlet for mixed solution of treated liquid and phenol that is provided at the other end of the cylindrical extraction container.

4. The concentrated acid treatment unit according to claim 3, wherein at positions of the respective flashboards at a lower part of the cylindrical extraction container, liquid outlets/inlets are provided that are appropriately used to collect liquid or to input phenol.

5. The concentrated acid treatment unit according to claim 4, wherein the treated liquid introduction opening further has a pressure feeding blade.

6. A concentrated acid treatment unit in which a phenol sorped raw material obtained by subjecting phenol to sorption by a botanical resource is reacted with concentrated acid and then phenol is added to the resultant treated liquid to extract a lignophenol derivative, comprising:

a reaction section for obtaining treated liquid by the reaction between the phenol sorped raw material and the concentrated acid; and an agitation extraction section for adding phenol to the treated liquid to thereby extract mixed solution including a lignophenol derivative, wherein the reaction section has a reactor body and agitation blades provided in the reactor body such that the highly viscous and massive treated liquid obtained by the reaction between the phenol sorped raw material and the concentrated acid is rolled by an inner circumference face of the reactor body and the agitation blades for fragmentation, wherein the reactor body is composed of a cylinder for which a shaft axis is in a horizontal direction and has a phenol sorped raw material introduction opening at one end thereof and has a treated liquid outlet at the other end thereof, the agitation blades are configured so that base ends are fixed to a rotation axis provided in the reactor body, extend from the rotation axis to an inner circumference face of the reactor body in a radial fashion, have blade tip ends having a comb-like shape, and one blade tip end and the other blade tip end are arranged in zigzag alignment, and the blade tip end and an inner circumference face of the reactor body have therebetween a clearance such that the highly viscous and massive phenol sorped raw material obtained by the reaction with the concentrated acid is rolled for fragmentation, and the agitation extraction section has:

a cylindrical extraction container for which a shaft axis direction is a horizontal direction;

a rotation axis provided in the cylindrical extraction container;

a plurality of flashboards having circular ring shape arranged in the cylindrical extraction container in a shaft axis direction;

extraction agitation blades that are provided among the respective flashboards and that are provided at the rotation axis;

a treated liquid introduction opening provided at one end of the cylindrical extraction container;

a plurality of extraction phenol inlets provided at the middle part of the cylindrical extraction container; and a liquid outlet for mixed solution of treated liquid and phenol that is provided at the other end of the cylindrical extraction container.

7. A Phase-Separation system plant for botanical resource, comprising:

a raw material pre-treatment unit for defatting a botanical resource-derived raw material to add phenol thereto to thereby obtain a phenol sorped raw material, and the concentrated acid treatment unit according to any of claims 1 to 6.

8. A Phase-Separation system plant for botanical resource, comprising:

a raw material pre-treatment unit for defatting a botanical resource-derived raw material to add phenol thereto to thereby obtain a phenol sorped raw material, the concentrated acid treatment unit according to any of claims 1 to 6, and a collecting unit for separating the mixed solution including a lignophenol derivative sent from the concentrated acid treatment unit to obtain phenol solution including a lignophenol derivative and concentrated acid solution including a cellulose hydrolysate using a difference in specific gravity between the phenol solution and the concentrated acid solution and collecting the respective solutions in different tanks.

* * * * *